United States Patent [19]

Nishikaji

[11] Patent Number: 5,044,459
[45] Date of Patent: Sep. 3, 1991

[54] AUTOMOBILE SEAT BELT APPARATUS
[75] Inventor: Satoshi Nishikaji, Hiroshima, Japan
[73] Assignee: Mazda Motor Corporation, Hiroshima, Japan
[21] Appl. No.: 426,225
[22] Filed: Oct. 25, 1989
[30] Foreign Application Priority Data Oct. 26, 1988 [JP] Japan .................. 63-270259

[51] Int. Cl.$^5$ ............................................. B60R 22/08
[52] U.S. Cl. ...................................... 180/268; 280/803
[58] Field of Search .............. 280/801, 804, 803, 802, 280/806, 807, 808; 242/107.4 A, 107.7; 297/478; 180/268, 281, 282

[56] References Cited

U.S. PATENT DOCUMENTS

| 4,209,186 | 6/1980 | Close | 280/806 |
|---|---|---|---|
| 4,817,754 | 4/1989 | Muramoto | 180/268 |
| 4,832,365 | 5/1989 | Kawai et al. | 280/804 |
| 4,856,728 | 8/1989 | Schmidt et al. | 242/107.7 |

FOREIGN PATENT DOCUMENTS

| 53-165527 | 12/1978 | Japan . |
|---|---|---|
| 54-7097 | 4/1979 | Japan . |
| 63-130450 | 6/1988 | Japan . |

Primary Examiner—Richard A. Bertsch
Attorney, Agent, or Firm—Wenderoth, Lind & Ponack

[57] ABSTRACT

A seat belt apparatus is provided for restraining the occupant of a seat assembly within a vehicle body structure having a plurality of closure members each hingedly supported for movement between opened and closed positions to selectively open and close a respective utility opening. The closure members may be front and rear side doors, a hood or a trunk lid. The seat belt apparatus includes a length of flexible belt having fixed and free ends opposite to each other, an automatic belt retractor rigidly connected with the free end of the belt for forcibly winding up the belt thereby holding the belt under tension, a detecting system for detecting the movement of at least one of the closure members towards the opened position, a locking mechanism built in the automatic belt retractor for preventing the belt from being pulled outwards from the automatic belt retractor when a predetermined acceleration acts thereon, and a cancelling mechanism for disabling the locking mechanism when the detecting system detects the movement of the at least one of the closure members towards the opened position. Instead of the cancelling mechanism, a sensitivity reducing mechanism may be provided for lowering the sensitivity of the locking mechanism.

12 Claims, 15 Drawing Sheets

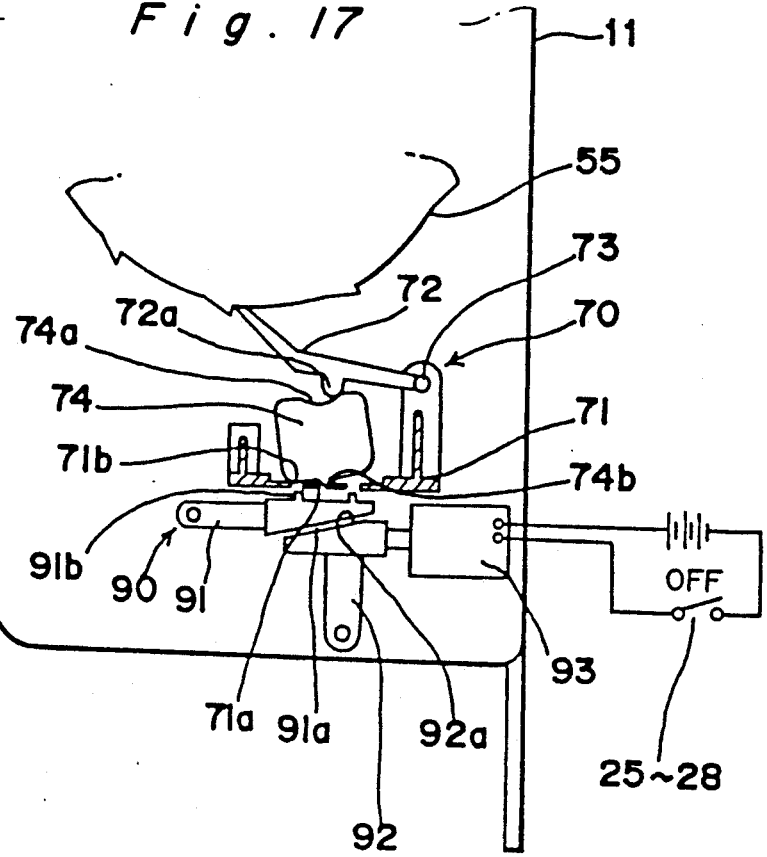
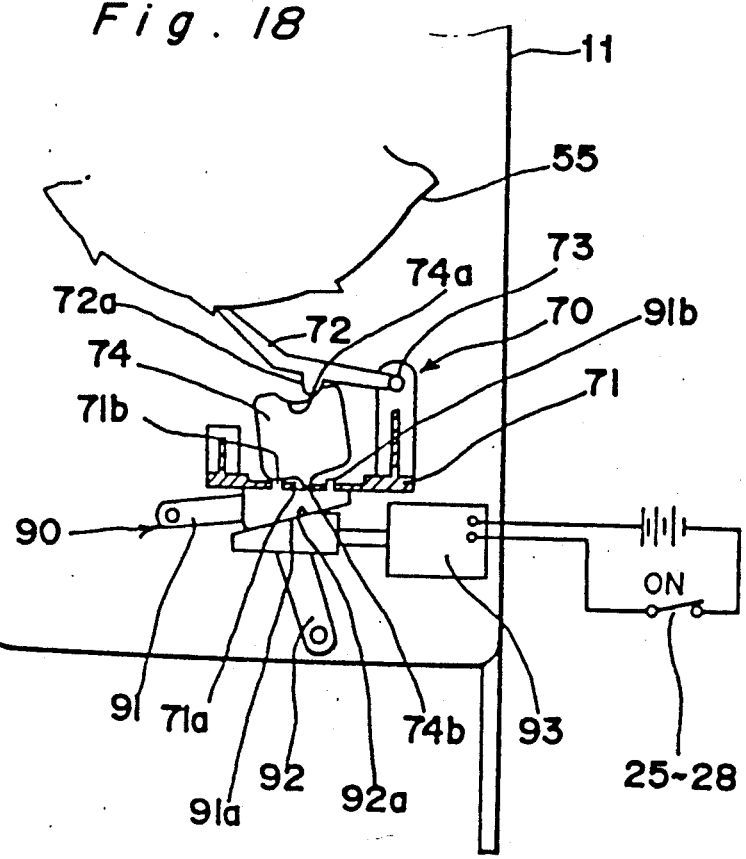

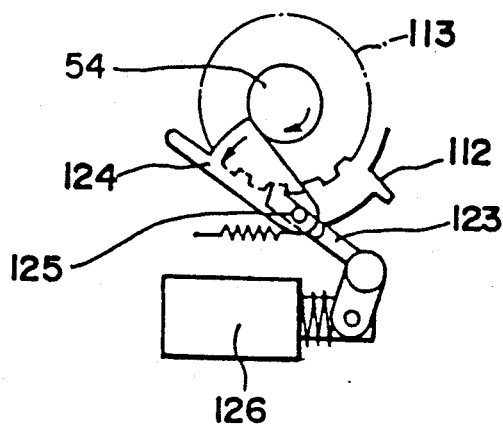
Fig. 24(f)
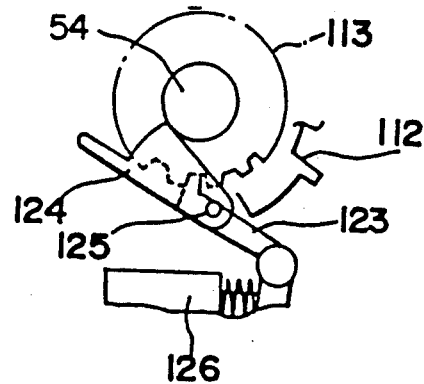
Fig. 24(g)
Fig. 25
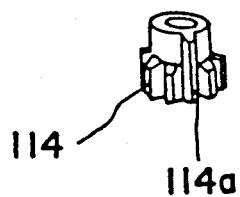
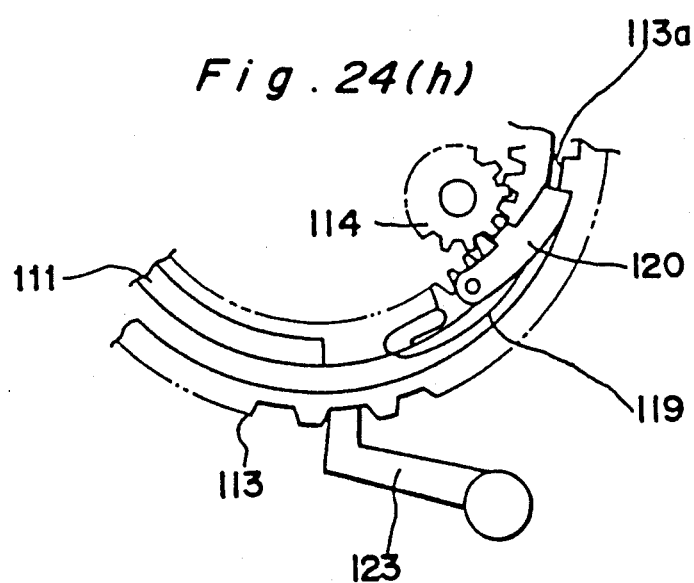
Fig. 24(h)
Fig. 26
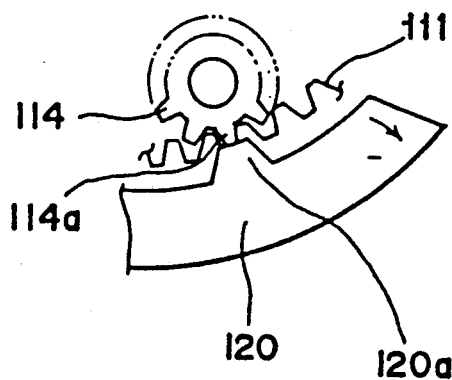
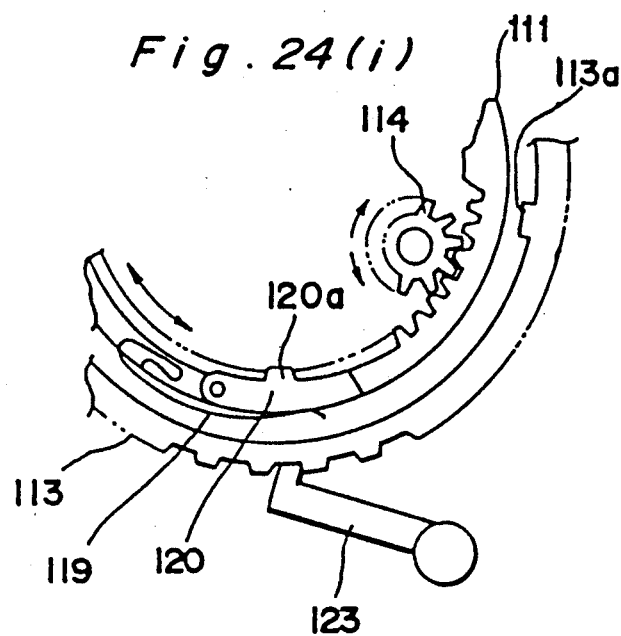
Fig. 24(i)

AUTOMOBILE SEAT BELT APPARATUS

CROSS-REFERENCE TO RELATED APPLICATIONS

U.S. Pat. No. 4,817,754, issued Apr. 4, 1989, to Hisao Muramoto and entitled "AUTOMOTIVE SEAT BELT SYSTEM AND RETRACTOR DEVICE FOR SEAT BELT SYSTEM", and U.S. Ser. No. 365,850, filed June 15, 1989, in the name of Takeshi Konishi et al. and entitled "AUTOMOTIVE SEAT BELT DEVICE".

BACKGROUND OF THE INVENTION

1. Field of the Invention

The present invention generally relates to a seat occupant restraining apparatus or seat belt apparatus and, more particularly, to a seat occupant restraining apparatus for use in an automotive vehicle for restraining at least a driver or passenger in a seat assembly in the event of occurrence of a hazardous condition.

2. Description of the Prior Art

The hardtop model of an automotive vehicle is well known in which no generally vertically extending center pillar is employed on opposite sides of the automotive body structure. An example of the prior art seat belt apparatus used in the hardtop model for at least a driver's seat is illustrated in FIG. 29 of the accompanying drawings, reference to which will now be made for.

In FIG. 29, reference numerals 5 and 6 represent rear and front side doors on one side of the automotive body structure, for example, on the right-hand side thereof, and a seat assembly generally identified by reference numeral 1 is a driver's seat. As shown therein, the driver's seat assembly 1 includes a seat back 1a hingedly connected at a lower end to a seat cushion 1b so that the seat back 1a can be adjustably tiltable relative to the seat cushion 1b. The prior art seat belt apparatus includes a length of belt 3 having a first end anchored firmly to any appropriate fixture which is generally located laterally rearwardly and downwardly of the waist of an occupant of the seat assembly, for example, a rear side portion of the seat cushion 1a adjacent the front side door 6. The opposite, second end of the length of belt 3 is operatively connected to an automatic belt retractor as will be described in detail later. A lap strap 3a extends from the first end of the length of belt 3 across the lap of the seat occupant, a shoulder strap 3b extends from the lap strap 3a diagonally upwardly of an upper body part of the seat occupant and then over a right-hand shoulder of the seat occupant for holding the upper body part of the seat occupant against the seat back 1a, and a marginal strap 3c extends from the shoulder strap 3b and terminates at the second end of the length of belt 3. A portion of the belt 3 between the lap strap 3a and the shoulder strap 3b loosely passes through a latch plate which is removably connected to a buckle 7, said buckle 7 being secured to a rear side portion of the seat cushion 1a remote from the front side door 6 and opposite to that to which the first end of the belt 3 is anchored.

If, as shown by the phantom lines, the second end of the belt were operatively connected with a belt retractor with the marginal strap having been loosely passed through a loop plate 2' attached to a roof rail immediately above the side window, the marginal strap might obviously extend generally vertically across the side window and may constitute an obstruction to the field of view of the seat occupant. The presence of such an obstruction within the field of view of the seat occupant tends to deteriorate the feeling of openness uniquely provided for by the hardtop model.

Therefore, in the prior art seat belt apparatus such as disclosed in, for example, Japanese Laid-open Patent Publication No. 63-130450, published June 2, 1988, a portion of the belt 3 between the shoulder strap 3b and the marginal strap 3c loosely passes through a guide 4 mounted atop the seat back 1a, with the second end of the belt 3 operatively connected with a belt retractor 2 that is embedded in the rear side door 5. As a matter of general practice, the belt retractor 2 used in the prior art seat belt apparatus is provided with a lock mechanism by which the length of belt 3 can be freely retracted into and drawn out from the retractor during normal use and by which the length of belt 3 can be locked in position when a predetermined force of acceleration acts on the length of belt 3 and is subsequently transmitted to the belt retractor 2.

The prior art system wherein the belt retractor is employed within the rear side door has been found to prevent a possible problem in that, when the rear side door carrying the belt retractor is abruptly opened or closed, the acceleration acts on the locking mechanism built in the belt retractor to such an extent as to result in the locking of the belt retractor. In particular, when the belt retractor is consequently locked by the abrupt opening of the rear side door, the length of belt can be no longer pulled outwards from the belt retractor and it may happen that the rear side door will not open smoothly and/or the seat occupant may be restrained tight during the opening of the rear side door. On the other hand, when the belt retractor is consequently locked by the abrupt closure of the rear side door, the seat occupant may be insufficiently restrained and may therefore be required to reposition the belt.

Similar problems may occur when some closure members each hingedly supported for movement between opened and closed positions for selectively opening and closing a respective access opening, such as, for example, a front side door, a rear door, a engine hood, and a trunk lid, closure members other than the rear side doors, are opened or closed so abruptly and so roughly as to induce vibrations of a magnitude that may cause the locking mechanism to operate.

SUMMARY OF THE INVENTION

The present invention has been devised with a view to substantially eliminate the above-discussed problems inherent in the prior art seat belt apparatuses and has as its essential object to provide an improved seat belt apparatus for retraining the seat occupant in the event of a hazardous condition such as, for example, an automobile collision, which apparatus is effective to avoid any possible unnecessary or premature operation of the belt retractor while permitting the door assembly carrying the belt retractor to be selectively opened and closed smoothly.

The present invention pertains to a seat belt apparatus for restraining the occupant of a seat assembly within a vehicle body structure having at least one side door for selectively opening and closing an access opening leading to the seat assembly, said vehicle body structure also having a plurality of closure members each hingedly supported for movement between opened and closed positions for selectively opening and closing a respective utility opening. The seat belt apparatus according to one embodiment of the present invention comprises a length of flexible belt having fixed and free ends opposite to each other, an automatic winding means rigidly connected with the free end of the belt for forcibly winding up the belt thereby holding the belt under tension, a detecting means for detecting the movement of at least one of the closure members to the opened position, a locking mechanism built in the automatic winding means for restraining the belt from being pulled outwards from the automatic winding means when a predetermined acceleration acts thereon, and a cancelling mechanism built in the automatic winding means for disabling the locking mechanism when the detecting means detects the movement of said at least one of the closure members to the opened position.

In another preferred embodiment of the present invention, instead of employing the cancelling mechanism, a sensitivity reducing mechanism is employed for lowering the sensitivity of the locking mechanism when the detecting means detects the movement of the closure member to the opened position.

Preferably, the closure members referred to above include front side doors, rear side doors, an engine hood, a trunk lid and a rear access door or lid.

The seat belt apparatus may further comprise a holding means operable to keep either the cancelling mechanism or the sensitivity reducing mechanism in operation for a predetermined length of time subsequent to the arrival of the closure member at the closed position.

According to the present invention, when the detecting means detects the movement of the closure member to the opened position, the locking operation of the locking mechanism built in the belt retractor can be disabled by the cancelling mechanism, thereby any possible erroneous operation of the locking mechanism as a result of the application of a vibration and/or an acceleration induced in the closure member being moved can be avoided, allowing the closure member to be moved smoothly without the belt unnecessarily restraining the seat occupant.

The employment of the holding means is particularly advantageous in that, since the operation of either the cancelling mechanism or the sensitivity reducing mechanism can be sustained for a predetermined length of time subsequent to the moment at which the closure member is closed, the locking mechanism will not be erroneously operated even though vibrations induced as a result of the closure member being roughly and abruptly closed, and/or vibrations reverberating therefrom, are applied. Thus the belt retractor will be reliable.

BRIEF DESCRIPTION OF THE DRAWINGS

These and other objects and features of the present invention will be described in detail in connection with preferred embodiments thereof with reference to the accompanying drawings, in which:

FIGS. 17 and 18 are views similar to FIG. 16, locking mechanism and the sensitivity reducing mechanism assuming different operative positions, respectively;

FIGS. 24(a) to 24(i) are schematic diagrams showing the tension reliever in the belt retractor assuming different operative positions, respectively;

FIG. 25 is a perspective view of an idle gear employed in the tension reliever;

FIG. 26 is a fragmentary diagram showing the relationship between the idle gear and a hook;

DETAILED DESCRIPTION OF THE PREFERRED EMBODIMENTS

Figure 29:
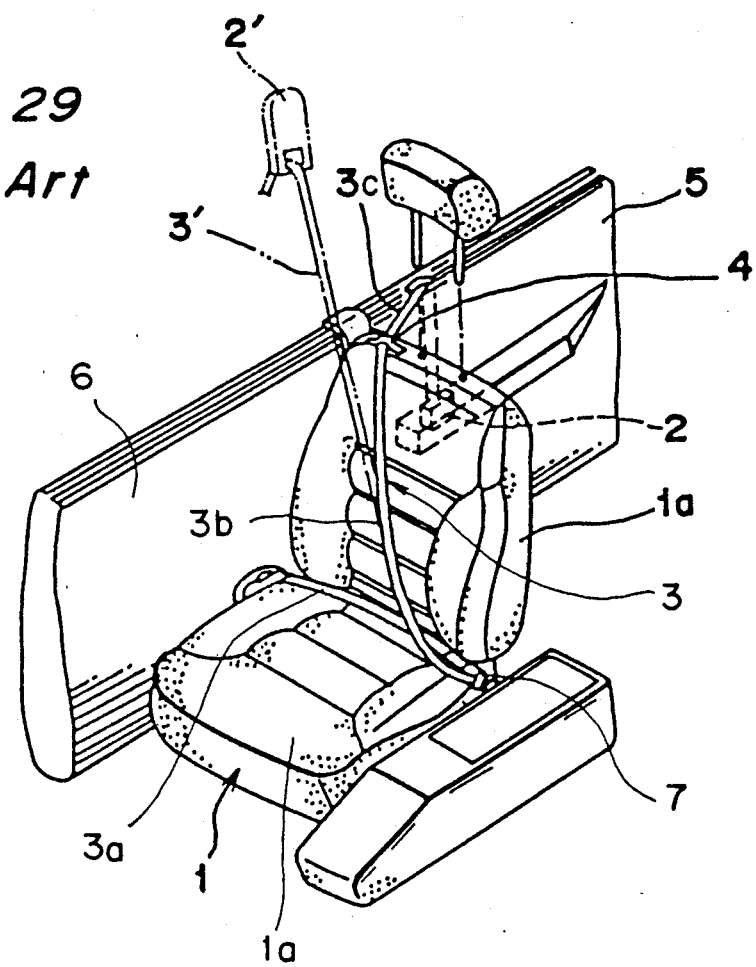
FIG. 29 is a perspective view of a driver's seat assembly as viewed from the interior of an automobile body structure in a direction rearwardly thereof, which seat assembly is equipped with the prior art safety seat belt system.

Before the description of the present invention proceeds, it is to be noted that, as far as the present invention is concerned, that is, except for FIG. 29 pertaining to the prior art seat belt apparatus, like parts are designated by like reference numerals.

Figure 1:
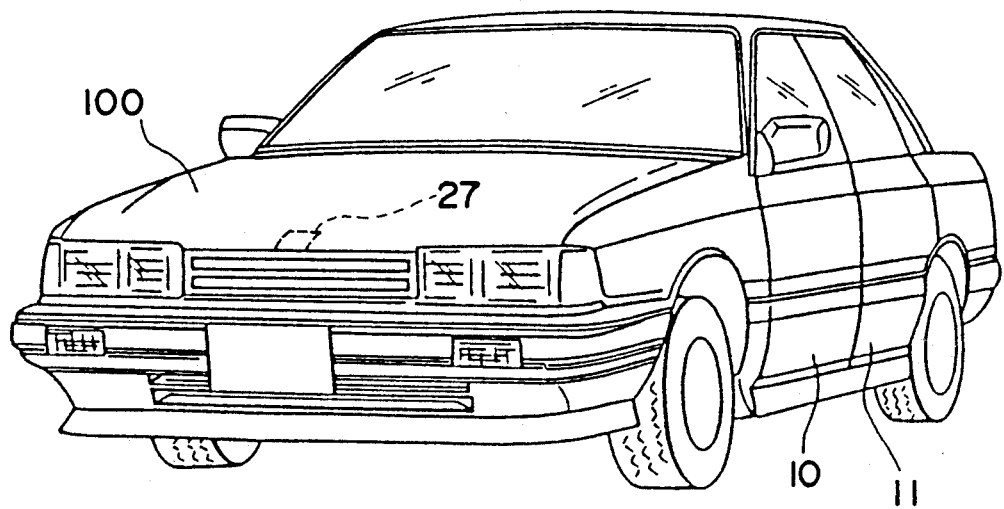
FIG. 1 is a perspective view of a hardtop-model automobile to which the present invention is applicable.
Figure 2:
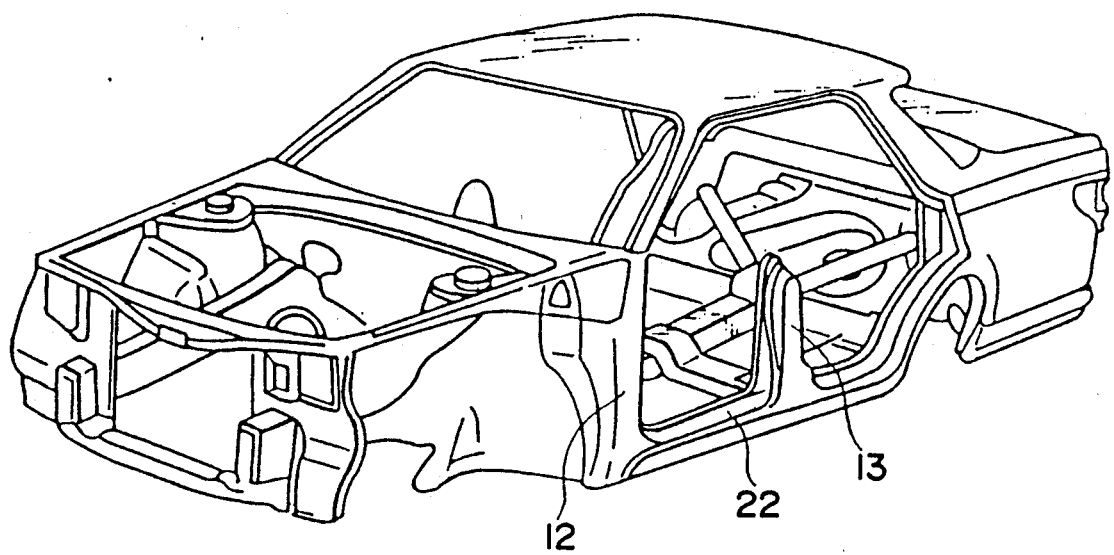
FIG. 2 is a perspective view of body structure of the automobile shown in FIG. 1.

Referring first to FIGS. 1 and 2, an automobile of a hardtop model to which the present invention is applicable is known as having no center pillar. The automobile shown therein has front and rear side doors 10 and 11 on each side of an automobile body structure. The automobile body structure best shown in FIG. 2 may be of a unitized construction including a pair of side sills 22 spaced apart from each other in a direction widthwise of the body structure and extending generally horizontally in a direction lengthwise of the body structure, front pillars 12 each extending generally upwardly from a front end of the corresponding side sill 22, rear pillars each extending generally upwardly from a rear end of the corresponding side sill 22 and so configured as to partially encircle a rear tire housing, and intermediate support posts 13 each positioned intermediate between the front and rear pillars and extending upwardly from the corresponding side sill 22 to a height beneath the eye-level of an occupant in the automobile, or to a height that is sufficient to permit the respective intermediate support pillar 13 to be concealed from sight when the associated front and rear side doors 10 and 11 are hingedly fitted to the body structure.

Each of the front side doors 10 is hinged to the associated front pillar 12 for movement between opened and closed positions, that is, for selectively opening and closing a front access opening leading to a front seat assembly, while each of the rear side doors 11 is hinged to the associated intermediate pillar 13 for movement between opened and closed positions, that is, for selectively opening and closing a rear access opening leading to a rear seat assembly.

The automobile body structure includes a hingedly supported hood 100 adapted to selectively open and close an access opening leading to a front engine compartment and a similarly hingedly supported trunk lid adapted to selectively open and close an access opening leading to a rear trunk space. For reasons which will become clear, the hood has associated therewith a bonnet switch 27, shown in FIG. 27 and in FIG. 1 in phantom lines, which switch 27 is adapted to be turned on or off to provide an electric signal indicative of whether the hook is open. Similarly, the trunk lid has associated therewith a lid switch 28 shown in FIG. 27 which is adapted to be turned on or off to provide an electric signal indicative of whether the trunk is open.

Figure 3:
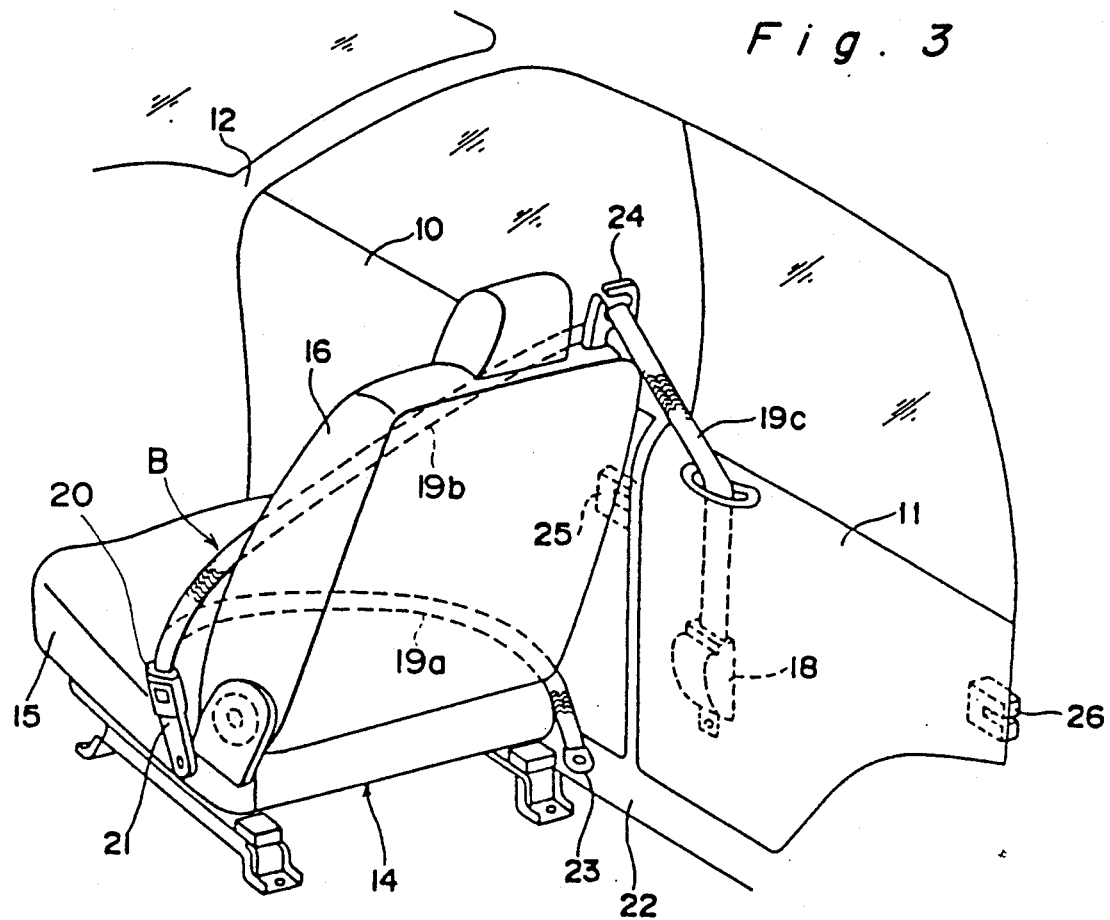
FIG. 3 is a schematic perspective view of a driver's seat assembly as viewed from the interior of an automobile body structure in a direction torwards the frontward thereof, which seat assembly is equipped with a safety seat belt system.
Figure 4:
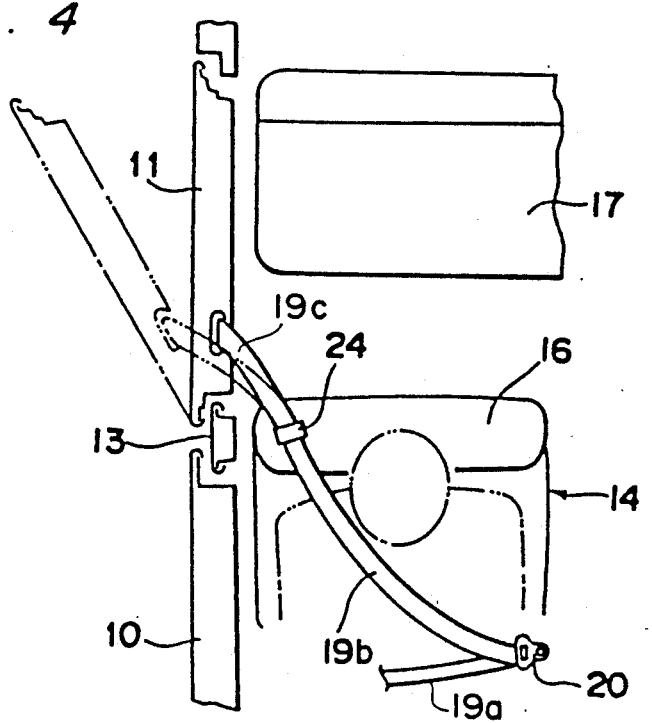
FIG. 4 is a schematic top plan view of the seat assembly shown in FIG. 3.

Referring now to FIGS. 3 and 4, a driver's seat assembly is designated generally by reference numeral 14, occupying a position frontwardly of a rear seat assembly 17 which rear seat assembly may extend continuously over the width of the automobile body structure. For purposes of illustration, shown in association with the driver's seat assembly 14 is one of the front side doors 10 closest to the driver's seat assembly 14 and one of the rear side doors 11 which is immediately behind such one of the front side doors 10.

The seat assembly 14 may be of any known type and of any known constructions, including a seat cushion 15, mounted inside and on a floor boot of the body structure. The position of the seat assembly may be adjustable in a direction longitudinally of the body structure. And a seat back 16 is hingedly connected at a lower end to a rear end of the seat cushion 15 so as to be tiltable relative to the seat cushion 15.

A seat belt apparatus embodying the present invention and employed for the driver's seat assembly 14 comprises a belt retractor 18 housed within the rear side door 11, a length of belt B and a belt guide member 24, mounted atop the seat back 16 at a position corresponding to the righthand shoulder of the person occupying the seat assembly 14, for guiding the movement of the length of the belt B therethrough. The length of belt B has a first end anchored firmly to a lap anchor 23 which is generally located laterally rearwardly and downwardly of the waist of a set occupant, for example, at a portion of the side still 22 adjacent the associated intermediate support pillar 13, and an opposite, second end operatively coupled with the belt retractor 18 so as to be selectively extendable from and retractable into the belt retractor 18. A lap strap 19a extends from the first end of the length of belt B across the lap of the seat occupant, a shoulder strap 19b extends from the lap strap 19a diagonally upwardly of an upper body part of the occupant of the seat assembly 14 and then over a right-hand shoulder of the seat occupant for holding the upper body part of the seat occupant against the seat back 16, and a marginal strap 19c extends from the shoulder strap 19b and terminates at the second end of the length of belt B. A portion of the belt B between the lap strap 19a and the shoulder strap 19b passes loosely through a latch plate 20 which is removably connected to a buckle 21, said buckle 21 being secured to a rear side portion of the seat cushion 15 remote from the front side door 10 and opposite to that to which the first end of the belt B is anchored.

It is to be noted that with respect to belt B, there is no clear division between the lap strap 19a and the shoulder strap 19b and between the should strap 19b and the marginal strap 19c, i.e. belt B is contiguous over the entire length thereof. The terms "lap strap" and "shoulder strap" used hereinabove and hereinafter are used in relation to the seat occupant sitting on the seat assembly 14 and refer to these portions of the length of belt B which functionally confront the lap and the upper body of the seat occupant, respectively. Alternatively, the length of belt B may comprise lap and shoulder straps separate from each other and, in a case, the lap and shoulder straps may be rigidly connected to the latch plate 20 and the lap strap may have an adjustable length similar to a belt. Again, in a broad aspect of the present invention, the lap strap may not always be essential in the practice of the present invention and the belt may include only the shoulder strap and the marginal strap.

Figure 5:
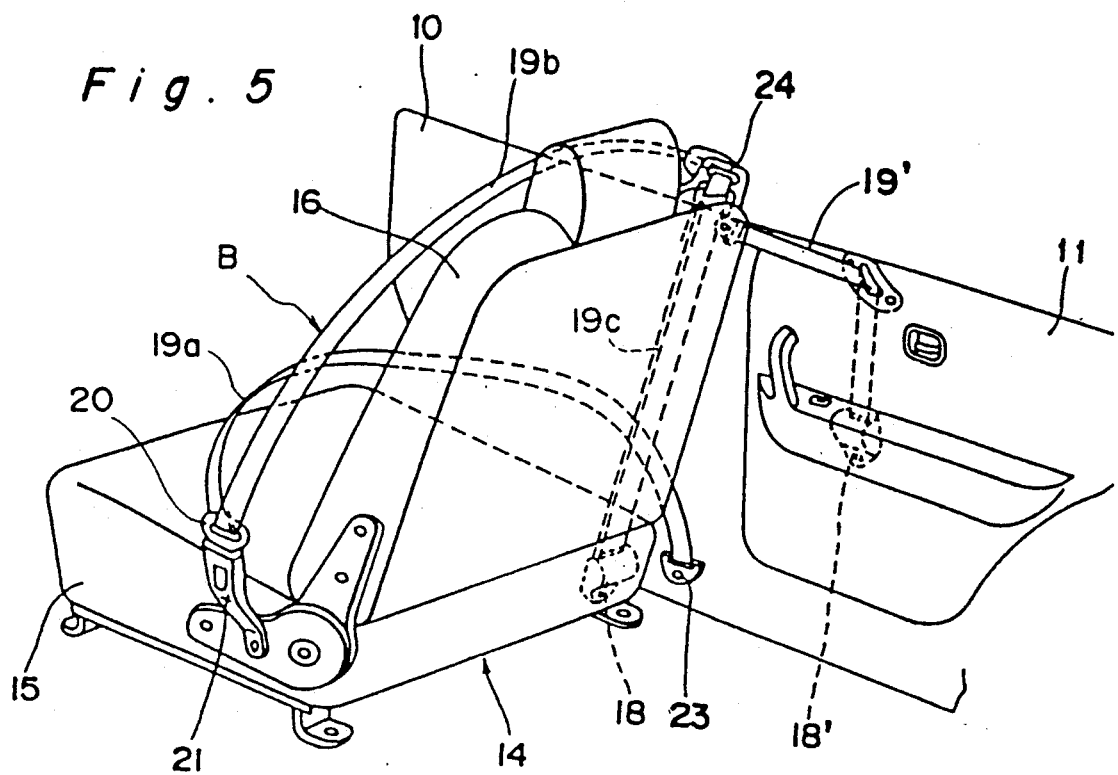
FIG. 5 is a view similar to FIG. 3, showing a modified form of the safety seat belt system.

Although in the foregoing embodiment the belt retractor 18 has been described and shown as installed inside the rear side door 11, the belt retractor 18 may be installed within the seat cushion 15 at a location immediately below the belt guide member 24 with the marginal strap 19c extending downwardly inside the seat back 16 from the belt guide member 24 towards the belt retractor 18 as shown in FIG. 5. Where the arrangement shown in FIG. 5 is employed, it is advisable to employ an auxiliary belt retractor 18', installed inside the rear side door 11, and an auxiliary strap 19' connected at one end with the seat back 16 and at the opposite end with the auxiliary belt retractor 18' for preventing any possible abrupt forward tilting of the seat back 16 relative to the seat cushion 15 in the event of a hazardous condition, for example, a front end collision.

Figure 27:
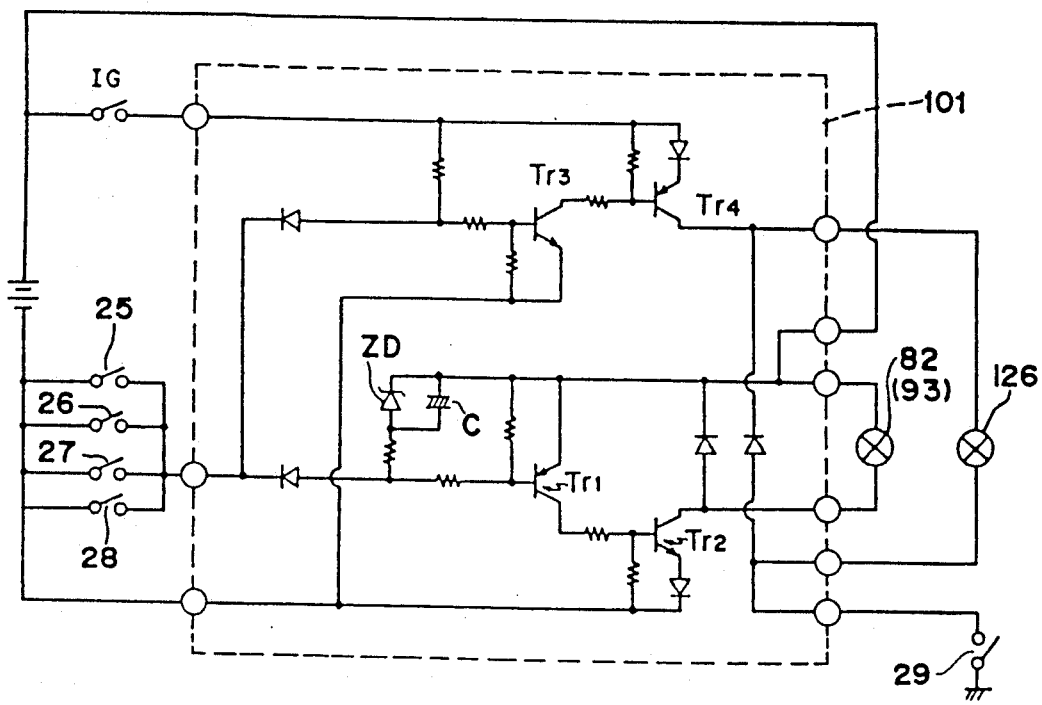
FIG. 27 is a circuit diagram of an electric control circuit employed in connection with the seat belt apparatus of the present invention.

As best shown in FIGS. 3 and 27, the front and rear side doors 10 and 11 laterally of the seat assembly 14 equipped with the seat belt apparatus have associated therewith respective door switches 25 and 26 each adapted to be switched on when the respective side door 10 or 11 is opened to provide an electric signal indicative of the opening of the respective side door 10 or 11. Similarly, the buckle 21 has a buckle switch 29 built therein, which switch 29 is adapted to be turned on in response to the engagement of the latch plate 20 therewith to provide an electric signal indicative of the coupling of the latch plate 20 with the belt buckle 21.

Figure 6A:
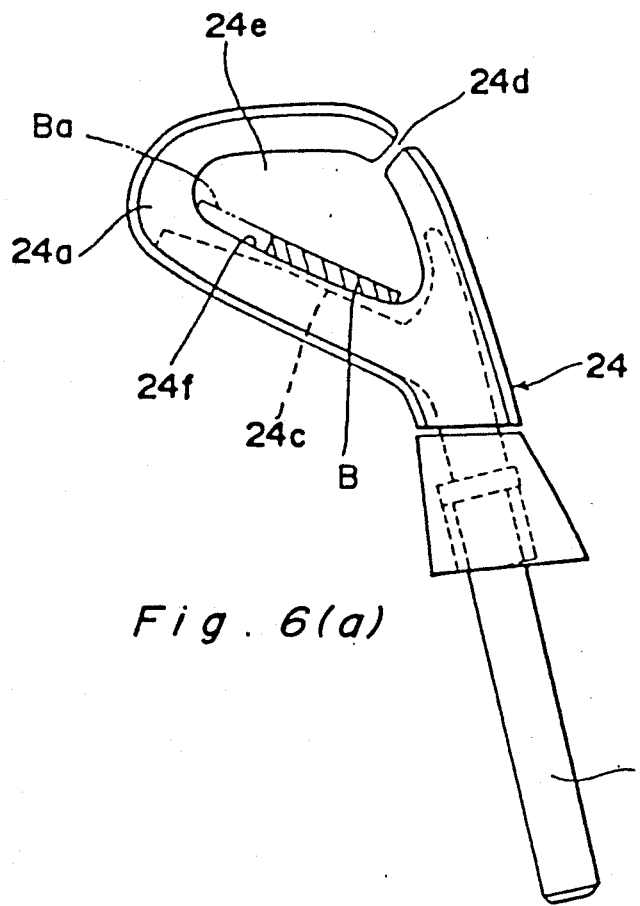
FIGS. 6(a) and 6(b) are front elevational and side views respectively, of a belt guide mounted atop the seat assembly.
Figure 6B:
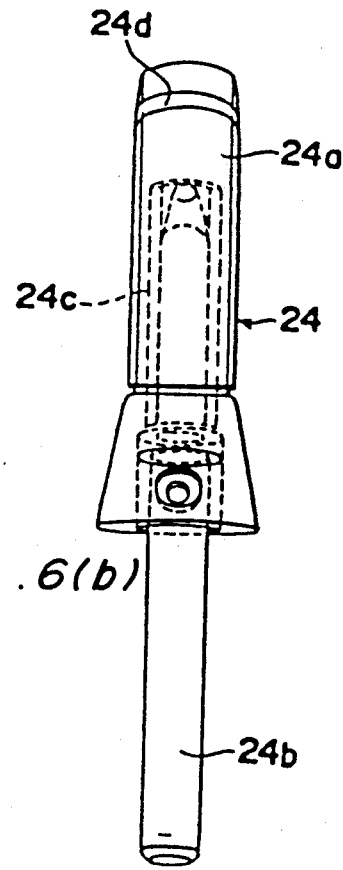

The details of the belt guide member 24 mounted rigidly on an upper portion of the seat back 16 for accommodating the belt B between the shoulder strap 19b and the marginal strap 19c are shown in FIGS. 6(a) and 6(b), reference to which will now be made. As shown therein, the belt guide member 24 comprises a generally Y-shaped stud post 24b having forked arms 24c defined at one end thereof and a generally C-shaped body 24a having a generally triangular opening 24e and a split 24d both defined therein. Body 24a is configured and molded to have a generally triangular shape with the slit 24d opening diagonally upwards. The C-shaped body 24a may be preferably made of synthetic resin and is formed on the forked arms 24c of the stud post 24b by the use of any known in-mold casting technique so that the forked arms 24c can serve a reinforcement for the body 24a.

The belt guide member 24 is mounted atop the seat back 16 with the stud post 24b inserted into a receptacle which may be defined in a right-hand top portion of the seat back 16 so as to extend downwards into the seat back 16. In any event, the generally C-shaped body 24a having both the slit 24d and the generally triangular opening 24e defined therein is designed so that, when the belt guide member 24 is so mounted atop the seat back 16, a lower straight face 24f of the body 24a, which corresponds to the base of the triangle represented by the shape of the opening 24e, and the slit 24d can be oriented diagonally upwardly towards the front side door 10 and diagonally upwardly in a direction away from the front side door 10, respectively. Therefore a portion of the belt B between the shoulder strap 19b and the marginal strap 19c and passing through the opening 24e in the body 24a can be displaced smoothly along the lower straight face 24f to a position, shown by the phantom line Ba in FIG. 6(a), when the rear side door 11 is opened accompanied by an outward pull of the marginal strap 19c substantially as shown in FIG. 4.

Figure 9:
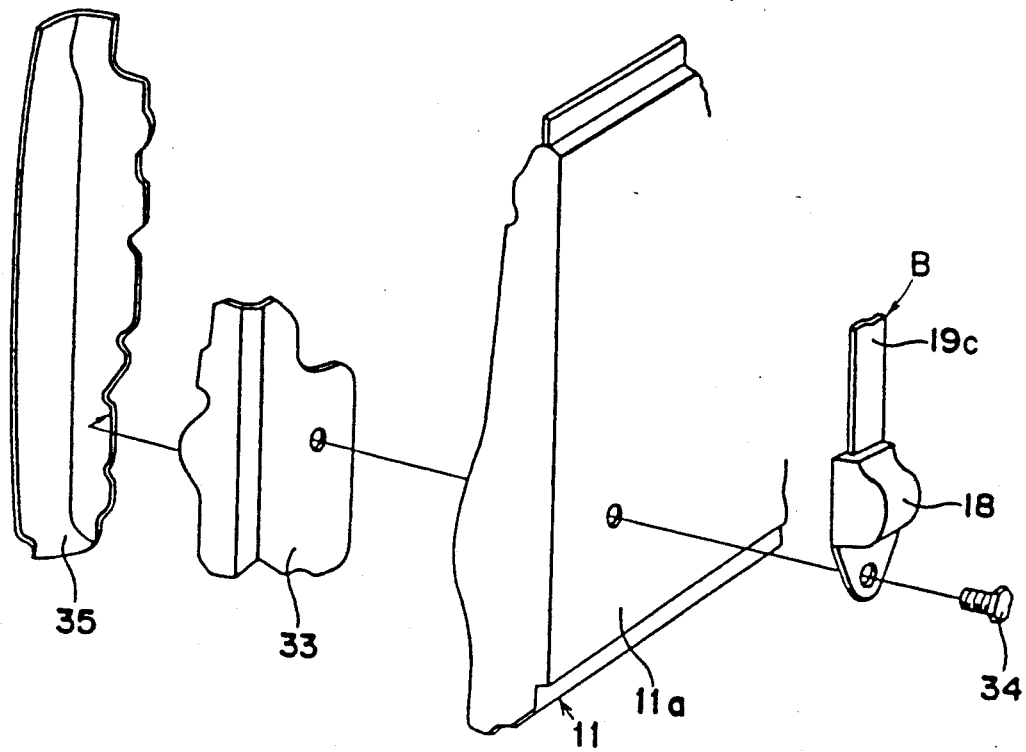
FIG. 9 is an exploded view of a portion of the rear side door showing the manner in which a belt retractor is installed.
Figure 10:
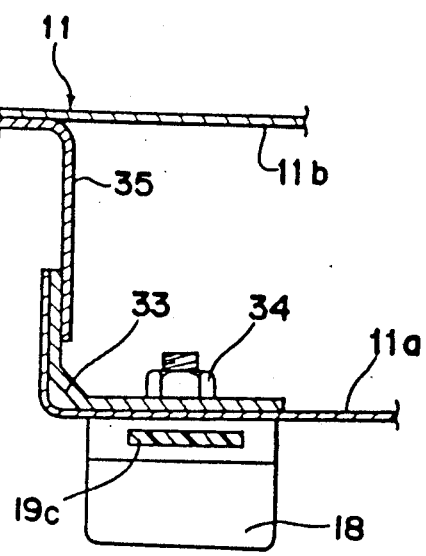
FIG. 10 is a sectional view of FIG. 9.

The belt retractor 19 described as installed in the rear side door 11 is supported in position inside the rear side door 11 in the following manner. As shown in FIGS. 9 and 10, the rear side door 11 has a generally double-walled structure including an outer door panel 11b and an inner door panel 11a joined together by means of end flange panels 35 with an interior space defined therebetween. The rear side door 11 also includes a generally L-sectioned robust bracket 33 to which a door checker is fixed, and bracket 33 is secured in part to the end flange panel 35 and in part to the inner door panel 11a.

The belt retractor 18 is rigidly secured exteriorly of the rear side door 11 by means of a bolt 34 passing through the inner door panel 11a and then through the robust bracket 33 with a nut fastened firmly thereto.

With the belt retractor 18 installed within the interior space defined in the rear side door 11 as hereinbefore described with reference to FIGS. 9 and 10, the marginal strap 19c of the length of belt B extends loosely and diagonally downwardly into the interior space of the rear side door 11 and is then deflected so as to extend straight downwards towards the belt retractor 18. For guiding the marginal strap 19c of the length of belt B in a manner so deflected as hereinabove described when such marginal strap 19c is alternately pulled outwards from and retracted into the belt retractor 18, a belt guide mechanism generally identified by reference numeral 36 is employed and installed at an upper portion of the interior space immediately above the belt retractor 18 as best shown in FIGS. 7 and 8, although it may be installed at a top portion of the associated intermediate support post 13 as an alternative design feature.

Figure 7:
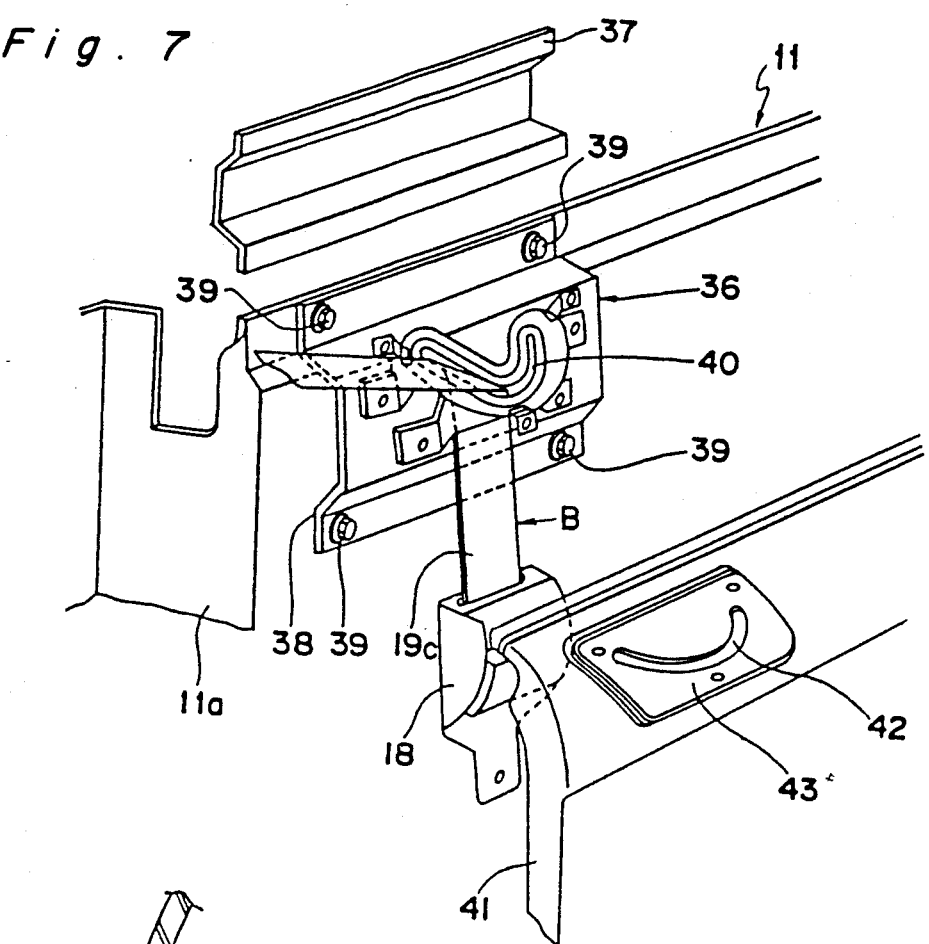
FIG. 7 is a perspective view of a belt guide mechanism built in a rear side door of the automobile body structure.
Figure 8:
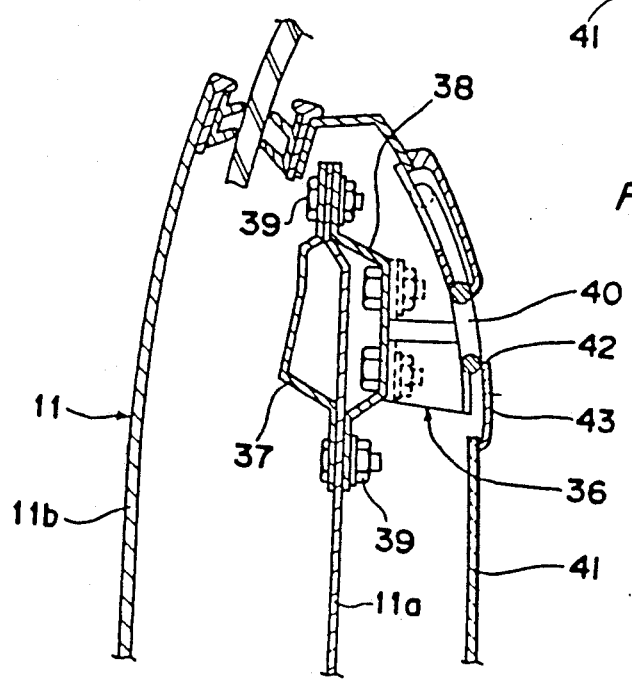
FIG. 8 is a sectional view of FIG. 7.

Referring now to FIGS. 7 and 8, the belt guide mechanism 36 shown therein comprises a reinforcement beam 37 secured to one of opposite surfaces of the inner door panel 11a confronting the interior space of the rear side door 11, and a guide plate 38 having a generally trapezoidal cross section and secured to the other of the opposite surfaces of the inner door panel 11a in alignment with the reinforcement beam 37. The reinforcement beam 37 and the guide plate 38 are firmly connected together, with the inner door panel 11a positioned therebetween, by means of a plurality of sets of bolts and nuts generally identified by reference numeral 39. The guide plate 38 has a generally arcuate slot 40 defined therein for facilitating the loose passage of the marginal strap 19c therethrough.

The rear side door 11 also comprises a trim panel 41 secured to one or both of the inner and outer door panels 11a and 11b in any known manner with its upper peripheral edge portion being so curved and so configured as to terminate adjacent a window slot through which a windowpane moves. A portion of the trim panel 41 corresponding in position to the belt guide mechanism 36 and generally disposed in alignment with the arcuate slot 40 has a slotted decorative cover 43 secured thereto, which cover 43 has a guide slot 42 defined therein for facilitating the loose passage of the marginal strap 19c therethrough and into the arcuate slot 40.

The employment of the belt guide mechanism 36 having the above-described structure is advantageous in that at least the marginal strap 19c of the length of belt B extending between the belt retractor 18 and the belt guide member 24 atop the seat back 16 will not be loaded and/or twisted so objectionably as to hamper a smooth movement of the marginal strap 19c. This will be discussed in detail with particular reference to FIGS. 11 to 13.

Figure 11A:
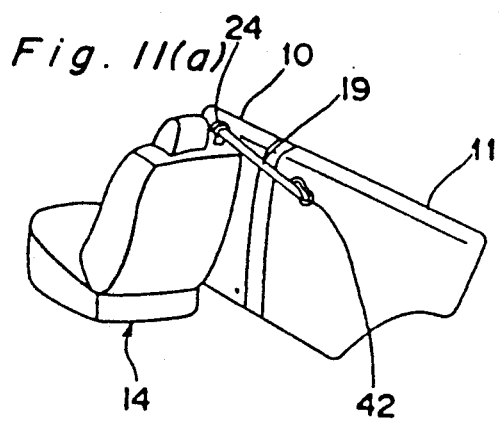
FIGS. 11(a) and 11(b) are a perspective view of the seat assembly as viewed from the rear and a front elevational view of the rear side door, respectively, showing a position of the seat belt when the seat back is in an upright position and the rear side door is closed.
Figure 11B:
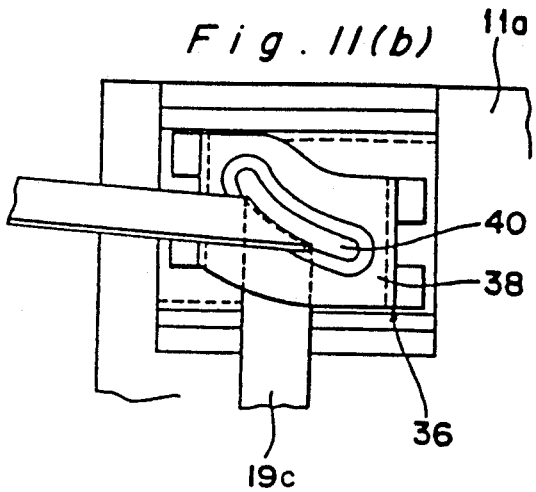
Figure 12A:
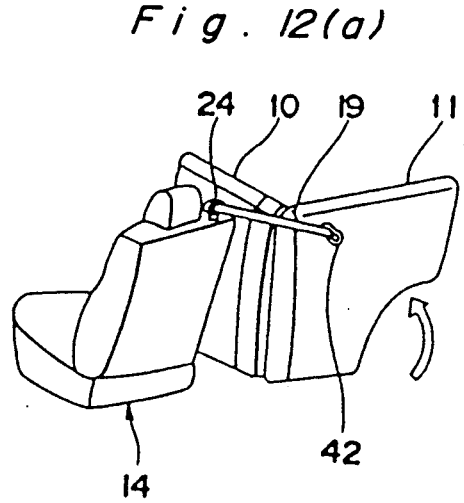
FIGS. 12(a) and 12(b) are views similar to FIGS. 11(a) and 11(b), respectively, showing another position of the seat belt when the seat back is in the upright position and the rear side door is opened.
Figure 12B:
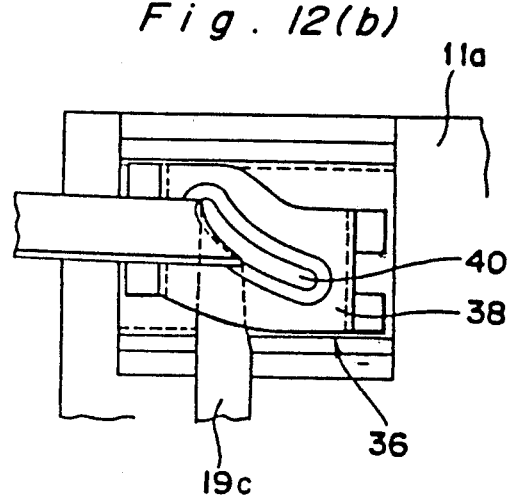

Assuming that the seat back 16 is in a normal upright position and the rear side door 11 is closed as shown in FIG. 11(a), a portion of the marginal strap 19c passing through the arcuate guide slot 40 assumes a position intermediate of the length of the arcuate guide slot 40 as shown in FIG. 11(b). When an attempt is made to open the rear side door 11 while the seat back 16 remains in the normal upright position as shown in FIG. 12(a), the length of belt B is pulled outwards during the movement of the rear side door 11 towards the opened position, causing that portion of the marginal strap 19c to displace towards one of the opposite ends of the arcuate guide slot 40 adjacent to the seat assembly 14. However, thanks to the employment of the arcuate guide slot 40 having a length greater than the width of the marginal strap 19c, that portion of the marginal strap 19c passing through the arcuate guide slot 40 is allowed to slide towards such one of the opposite ends of the arcuate guide slot 40 as shown in FIG. 12(b) so that the marginal strap 19c can move smoothly through the guide slot 40 with no possibility of being twisted.

Figure 13A:
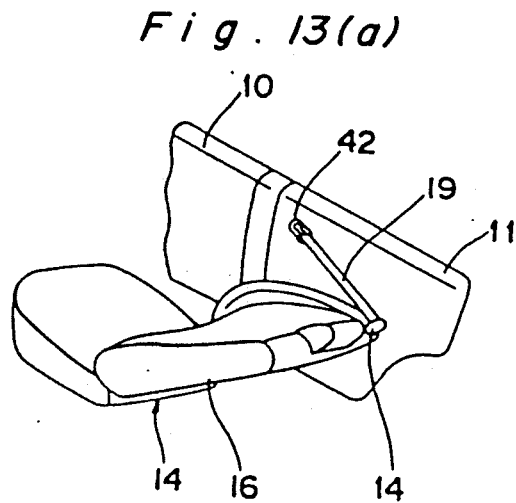
FIGS. 13(a) and 13(b) are views similar to FIGS. 11(a) and 11(b), respectively, showing a different position of the seat belt when the seat back is tilted backwards and the rear side door is closed.
Figure 13B:
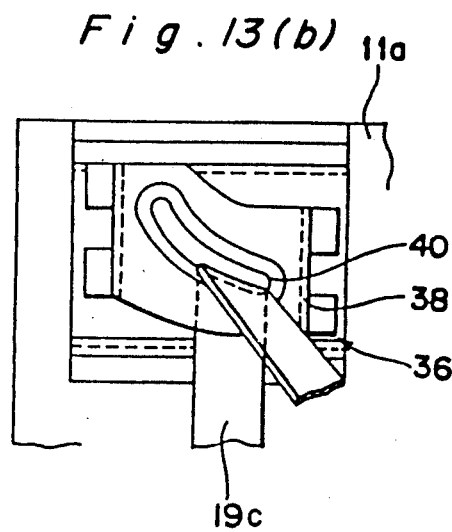

Should the seat back 16 be tilted backwards while the rear side door 11 is closed as shown in FIG. 13(a), the marginal strap 19c will be pulled rearwards as shown therein. However, the configuration of the arcuate guide slot 40 permits that portion of the marginal strap 19c to slide towards the other of the opposite ends of the arcuate guide slot 40 as shown in FIG. 13(b), in a manner substantially reverse to that shown in FIG. 12(b), and, therefore, the marginal strap 19c can move smoothly through the arcuate guide slot 40 with no possibility of being twisted.

Figure 14:
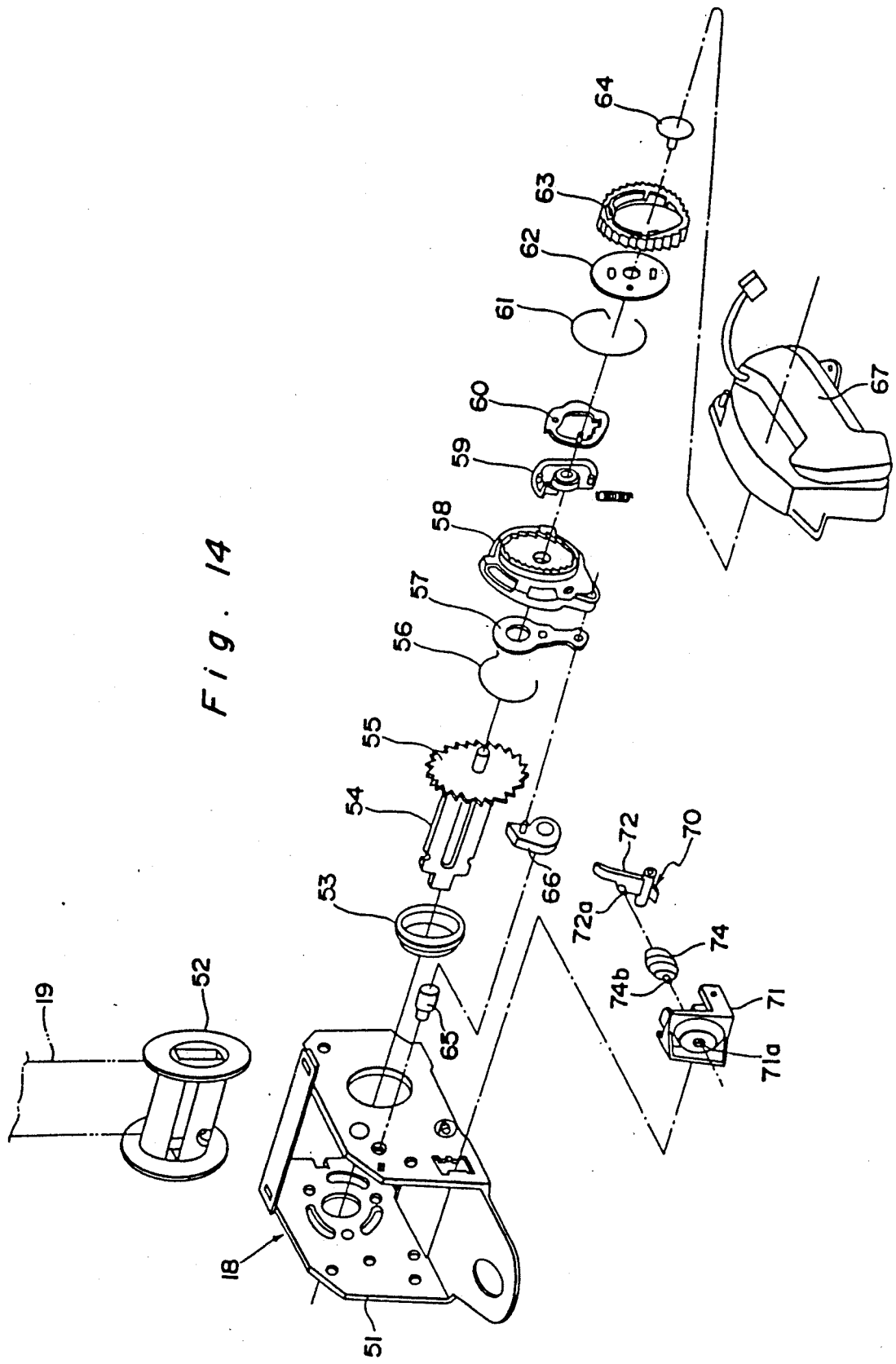
FIG. 14 is an exploded view of the belt retractor of the present invention.

The details of the belt retractor 18 will now be described with particular reference to FIG. 14.

The belt retractor 18 comprises a spool 52 to which the second end of the length of belt B is anchored. Spool 52 is disposed in a base unit 51 and is mounted on a flattened winding shaft 54, passed coaxially through the spool 52, for rotation therewith. Flattened winding shaft 54 is rotatably supported by the base unit 51 by means of a bearing member 53 and has one end formed integrally with a ratchet wheel 55. The ratchet wheel 55 has a stud shaft extending in a direction opposite to the flattened winding shaft 54, on which stud shaft is mounted an internally threaded lock ring 58 via a wire spring 56 and a tie plate 57 so as to encircle the toothed periphery of the ratchet wheel 55. The lock ring 58 accommodates therein a retainer 59, a hook 60, a clutch spring 61, a flywheel 62 and a flywheel gear 63, all set in position by a cap member 64 fitted to the lock ring 58. Selectively engageable with the ratchet wheel 55 is a pawl 66 pivotally mounted to the base unit 51 by means of a pivot pin 65. The assembly is in turn covered by a casing 67. Although not shown, the flattened winding shaft 54 is provided with a biasing spring for urging the spool 52 to rotate in a direction required to wind up the marginal strap 19c of the length of belt B.

In any event, the belt retractor 18 so far described is well known to those skilled in the art and, therefore, no further details thereof will be reiterated for the sake of brevity. It is to be noted that, other than the belt retractor having the above-described structure, any known belt retractor may be equally employed in the practice of the present invention.

Figure 15A:
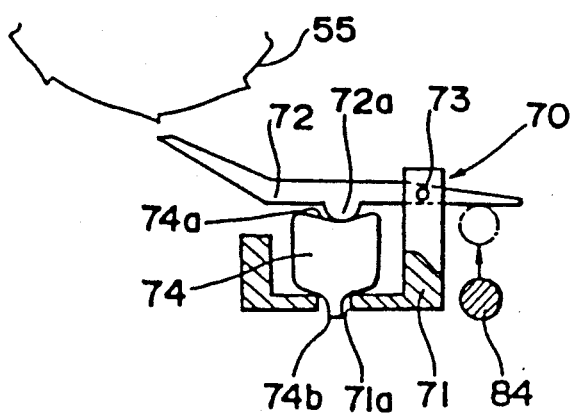
FIG. 15(a) is a fragmentary side sectional view of a locking mechanism and a sensitivity reducing mechanism both used in the seat belt apparatus of the present invention.

The belt retractor 18 is also known to have a locking mechanism 70 operatively associated with the ratchet wheel 55 for locking the ratchet wheel 55, when subjected to a predetermined force of acceleration, to prevent the length of belt 3 from being pulled from the belt retractor 18. The details of said locking mechanism 70 are shown in FIGS. 15 and 16.

The locking mechanism 70 disposed in the belt retractor 18 comprises a generally L-shaped support bracket 71 secured to the base unit 51 at a position laterally of the ratchet wheel 55, and a generally elongated actuating member or locking pawl 72 mounted at one end to the bracket 71 through a pivot pin 73 for pivotal movement about the pivot pin 73. When the actuating member 72 is pivoted clockwise about the pivot pin 73 as viewed in FIG. 15(a) through an angle greater than a predetermined angle, the other end of the actuating member 72 remote from the pivot pin 73 can be brought into engagement with one of the teeth of the ratchet wheel 55 to inhibit a rotation of the belt winding spool 52 in a direction required to permit the length of belt B to be pulled outwards from the retractor 18, that is, to place the retractor 18 in a locked position.

The actuating member 72 has a substantially intermediate portion thereof formed with a generally semi-circular-sectioned projection 72a protruding laterally outwardly therefrom in a direction generally opposite to the ratchet wheel 55, which projection 72a is seated on a generally cylindrical weight 74 that is freely movably mounted on the support bracket 71 in the manner which will now be described.

The generally cylindrical weight 74 has one end formed with a generally spherical recess 74a into which the projection 72a integral with the actuating member 72 is rockably seated, and an opposite end formed with a coaxial spindle 74b loosely engaged in a bearing hole 71a defined in the support bracket 71. It is to be noted that an annular end face of the weight defined at the opposite end thereof around the coaxial spindle 74b is radially inwardly and downwardly inclined as viewed in FIG. 15(a) so that the weight can undergo not only a pivotal motion, but also a tilting motion. The bearing hole 71a defined in the support bracket 71 is so positioned relative to the projection 72a integral with the actuating member 72 that, when the weight 74 is mounted on the support bracket 71 with the coaxial spindle 74b extending generally loosely in the bearing hole 71a, the projection 72a is be seated in the spherical recess 74a while aligned coaxially with the weight 74.

The weight 74 so mounted on the support bracket 71 is substantially supported by a peripheral lip region of the support bracket 71 around the bearing hole 71a, which lip region is held in contact with the annular end face of the weight 74 radially outwardly of the coaxial spindle 74b. Therefore, the weight 74 can undergo a rocking motion in dependence on an acceleration acting in a direction generally orthogonal to the rear side door 11, which acceleration will be hereinafter referred to as a horizontal acceleration.

More specifically, the locking mechanism 70 is designed so that while the weight 74 will assume an upright position as shown in FIG. 16 when and so long as the horizontal acceleration is zero or of a value close to zero, it can tilt leftwards, as viewed in FIG. 17, when the horizontal acceleration increases to a value greater than a predetermined value. Once the weight 74 tilts as shown in FIG. 17, the projection 72a integral with the actuating member 72 slides relative to the weight 74, riding over the spherical face defining the spherical recess 74a to allow the actuating member 72 to pivot clockwise, as viewed in FIG. 17, about the pivot pin 73 with the free end of the actuating member 72 consequently engaged with one of the teeth of the ratchet wheel 55 as shown in FIG. 17. It will readily be understood that, with the weight 74 being of a generally cylindrical shape, the above-described operation may take place with respect to an acceleration acting in a direction deviating from the horizontal direction. The acceleration at which the actuating member 72 can be pivoted about the pivot pin 73 through an angle required to permit the free end thereof to be engaged with the ratchet wheel 55 is so selected as to be of a value at which the seat occupant is required to be restrained in position on the seat assembly during the running of the automobile over rough ground.

Figure 15B:
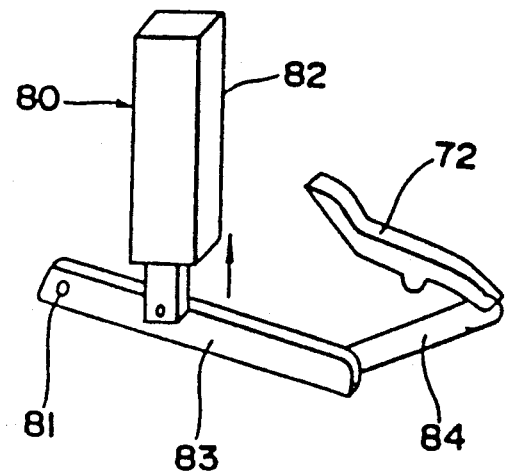
FIG. 15(b) is a perspective view, on an enlarged scale, of a cancelling mechanism employed in the seat belt apparatus of the present invention.
Figure 16:
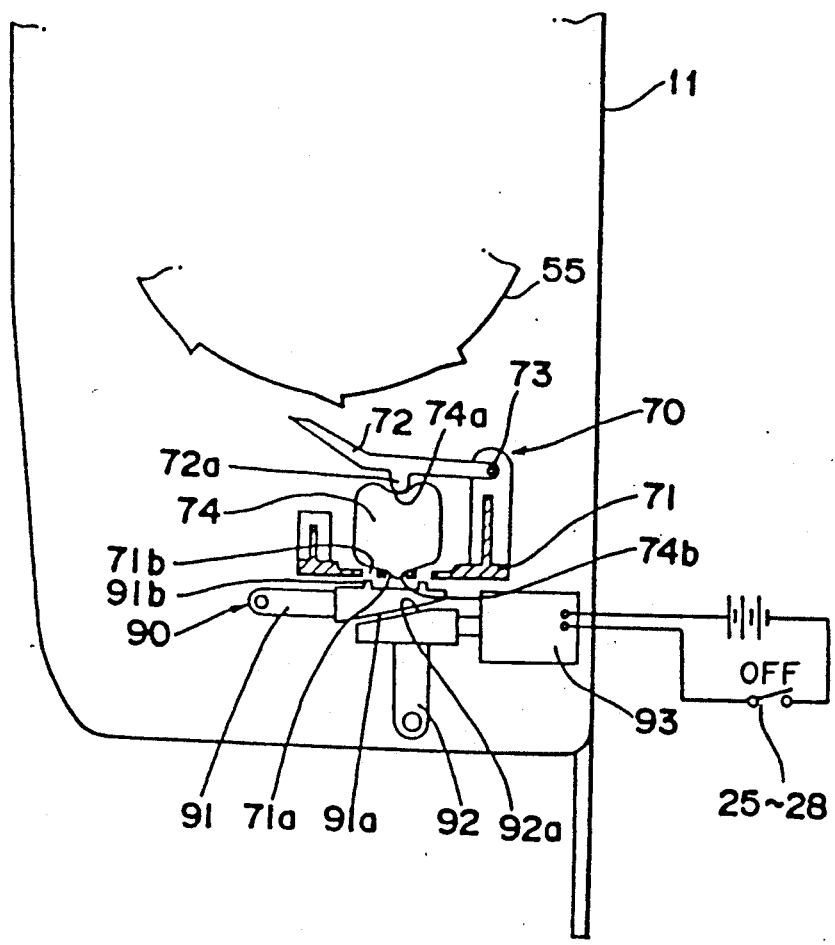
FIG. 16 is a fragmentary side sectional view of the locking mechanism and the sensitivity reducing mechanism according to a first embodiment thereof.

As shown in FIG. 15(b), a cancelling mechanism 80 operable to disable a locking operation of the locking mechanism 70 is provided laterally of the locking mechanism 70. This cancelling mechanism 80 comprises a pivot lever 83 having one end pivotably connected to the support bracket 71 by means of a pivot pin 81, and another end to which a rod 84 is rigidly connected so as to extend laterally therefrom towards and beneath the actuating member 72. A substantially intermediate portion of the pivot lever 83 is pivotally coupled with a solenoid unit 83 which acts to move the pivot lever 83 about the pivot pin 81 when such solenoid unit 83 is electrically energized. This cancelling mechanism 80 is so designed so that when the solenoid unit 83 is electrically energized to move the pivot lever 83 upwards, as viewed in FIG. 15(b), in a direction shown by the arrow about the pivot pin 81, a free end of the rod 84 remote from the pivot lever 83 is brought into engagement with one end of the actuating member 72 remote from the ratchet wheel 55 as shown by the phantom lines in FIG. 15(a), causing the actuating member 72 to pivot counterclockwise, as viewed in FIG. 15(a), about the pivot pin 73 to thereby prevent any possible displacement of the weight 74 and also to restrain the actuating member 72 from pivoting clockwise about the pivot pin 73 as viewed in FIG. 15(a).

Accordingly, when and so long as the solenoid unit 82 of the cancelling mechanism 80 is electrically energized, the locking mechanism 70 can be held in an inoperative position with no locking operation performed thereby.

The locking mechanism 70 referred to above may be considered as a sensitivity to the acceleration by which the locking mechanism 70 will be operated to lock the belt retractor 18, that is, by which the actuating member 72 will be pivoted about the pivot pin 73 through an angle required to permit the free end thereof to be engaged with the ratchet wheel 55. Accordingly, the cancelling mechanism 80 may be considered as being operable to render the locking mechanism 70 substantially insensitive to the acceleration although it can take one of two operative states; one being the state in which the locking mechanism 70 is rendered inoperative in the sense that the locking mechanism 70 is substantially insensitive to the acceleration, and the other being the state in which the locking mechanism is operated in response to the acceleration.

It is to be noted that, in the practice of the present invention, a sensitivity reducing mechanism 90 such as that shown in FIGS. 16 to 18 for lowering the sensitivity of the locking mechanism 70 may supersede the cancelling mechanism 80, the details of which mechanism 90 will now be described.

The sensitivity reducing mechanism 90 comprises a pair of mating lock control members 91 and 92 both pivotally mounted on the support bracket 71, and a solenoid unit 93 for driving one of the lock control members, for example, the lock control member 92 so far illustrated. The lock control members 91 and 92 have respective inclined faces 91a and 92a that are held in a face-to-face relationship with each other. The lock control member 91 has a circular row of equally spaced projections 91b of a predetermined height and formed on a face thereof generally opposite to the inclined face 91a and confronting the weight 74.

A portion of the support bracket 71 around the bearing hole 71a defined therein has a circular row of four equally spaced openings 71b as best shown in FIG. 16 for facilitating the passage of the corresponding projections 91b on the lock control member 91 therethrough by a predetermined distance upwardly from that portion of the support bracket 71 when the lock control member 91 is pivoted a predetermined angle upwardly about the pivot axis thereof.

The solenoid unit 93 for driving the lock control member 92 can be powered by a source of electric power, for example, an automobile battery, through a switch 25–28 which may be at least one of the switches 25 to 28 which are used to detect the opening of the front side door 10, the rear side door 11, the hood 100 and the trunk lid, respectively. In other words, the solenoid unit 93 can be electrically energized in response to the closure of at least one of the switches 25 to 28, that is, in response to the opening of at least one of the front side door 10, the rear side door 11, the hood 100 and the trunk lid, to drive the lock control member 92 leftwards as viewed in FIG. 18 and thereby cause lock control member 91 to be shifted in a direction generally perpendicular to the direction of drive of the lock control member 92. When the lock control member 91 is so shifted with the inclined face 91a sliding relative to the inclined face 92a of the lock control member 92, the projections 91b on the lock control member 91 protrude into and pass through the corresponding openings 71b in the support bracket 71 so that the weight 74 is supported not only by the peripheral lip region around the bearing hole 71b, but also on the projections 91b on the lock control member 91 with the annular face around the coaxial spindle 74b resting atop the projections 91b.

Because the weight 74 rests atop the projections 91b then protruding through the corresponding openings 71b that are arranged in the circular row spaced radially outwardly from the coaxial spindle 74b, the weight 74 is stably supported in the upright position and will undergo a rocking motion only when a relatively high acceleration acts in the horizontal direction. In this way, the sensitivity of the locking mechanism 70 can be lowered meaning that a relatively higher acceleration is required to move the weight 74 when the weight 74 rests atop the projections 91b than that required when the weight 74 is solely supported on the peripheral lip region of the support bracket 71 extending around the bearing hole 71b.

Thus, the sensitivity of the weight 74, and hence, that of the locking mechanism 70, varies depending on whether at least one of the front side door 10, the rear side door 11, the hood 100 and the trunk lid has been moved from the closed position the opened position or whether it has been moved from the closed position to the opened position. In addition, the acceleration at which the actuating member 72 can be pivoted about the pivot pin 73 through an angle required to cause the free end thereof to be engaged with the ratchet wheel 55 can be set at two levels. Therefore, during the running of the automobile over rough ground with all of the closure members normally held in the closed position, any arbitrary outward pull of the length of belt B from the belt retractor 18 can be prevented to restrain the seat occupant in a predetermined or desired posture on the seat assembly 14, and during the selective opening and closure of any one of the closure members including the rear side door 11, the length of belt B can be freely pulled relative to the belt retractor 18 without the seat occupant being unnecessarily constrained.

In the event of a relatively high acceleration as the result of an automobile collision, the length of belt B can be locked in position regardless of the state of any one of the closure members including the front side door 10, the rear side door 11, the hood 100 and the trunk lid, to restrain the seat occupant firmly against the seat assembly 14 to protect the seat occupant. Again, when the acceleration is zero or of a value close to zero such as when the automobile is running over flat ground, the length of belt B will not be locked and can be freely moved relative to the belt retractor 18 and, therefore, the seat occupant will not be unnecessarily constrained.

Figures 19A, 19B:
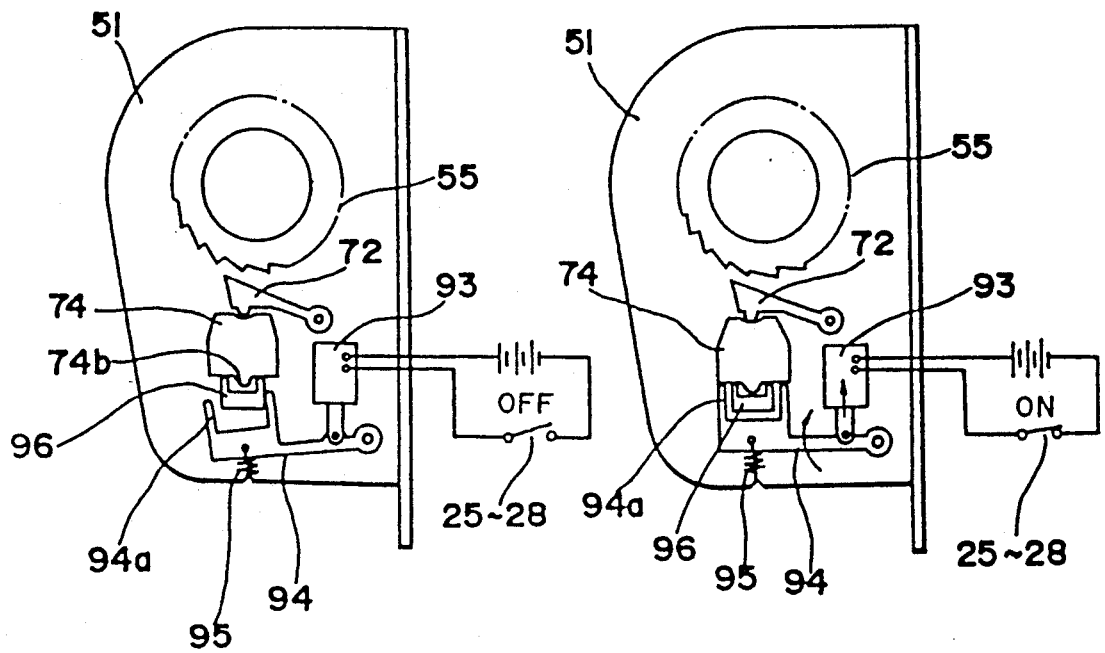
FIG. 19(a) is a schematic side view of the sensitivity reducing mechanism according to a second embodiment thereof.
FIG. 19(b) is a view similar to FIG. 19(a), showing the sensitivity reducing mechanism in a different operative position.

In the embodiment shown in and described with reference to FIGS. 16 to 18, the sensitivity reducing mechanism 90 has been described as comprising the lock control members 91 and 92 and the solenoid unit 93. However, as shown in FIGS. 19(a) and 19(b), instead of the employment of the paired lock control members 91 and 92, a lock control member 94 having a generally F-shaped configuration when viewed from the side may be employed. According to the modified form of the sensitivity reducing mechanism 90 shown in FIGS. 19(a) and 19(b), the F-shaped lock control member 94 is supported on the base unit 51 for movement up and down about a pivot axis and is normally biased downwards, as viewed in FIG. 19, by the action of a tension spring 95. This lock control member 94 will, when any one of the switches 25 to 28 is closed as a result of the opening of the associated closure member, pivot clockwise about the pivot axis against the tension spring 95 so that a generally cup-shaped support 94a defined on the lock control member 94 at a location opposite to the pivot axis will be upwardly shifted to lift the weight 74 slightly upwards with an annular peripheral free edge of the cup-shaped support 94a contacting from below the annular end face of the weight 74 extending around the coaxial spindle 74b.

According to the modification shown in FIG. 19, the weight 74 which was supported by a weight support member 96 at a position adjacent the coaxial spindle 74b during the closure of any one of the closure members can be supported by the cup-shaped support 94a integral with the lock control member 94 at a position radially outwardly from the coaxial spindle 74b when any one of the closure members is opened and, therefore, the weight 74 can be stably supported generally in the upright position, yielding similar effects to those exhibited by the embodiment of the sensitivity reducing mechanism 90 shown in and described with reference to FIGS. 16 to 18.

Figure 20:
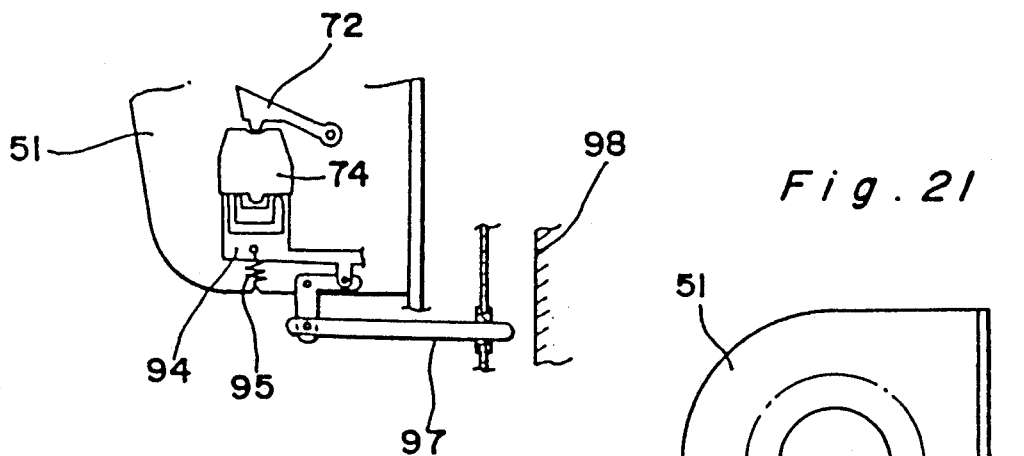
FIG. 20 is a view similar to FIG. 19(b), showing a modified form of the sensitivity reducing mechanism.

It is to be noted that, when the modified sensitivity reducing mechanism 90 shown in FIG. 19 is employed, an electric detecting system including the switches 25 to 28 for the detection of the opening of any one of the closure members may be replaced with a mechanical detector such as shown in FIG. 20. The mechanical detector shown in FIG. 20 comprises a slide link 97 having one end operatively coupled with the lock control member 94 and the other end protruding outwardly from, for example, the rear side door 11, and adapted to be pushed inwardly by a portion 98 of the automobile body structure, for example, a pillar. Therefore, when the rear side door 11 is moved from the closed position towards the opened position, the link 97 will be pushed inwardly to cause the lock control member 94 to pivot with the cup-shaped support 94a consequently shifted upwards. Even in this case, the lock control member 94 functions in a manner similar to that shown in FIG. 19.

Figure 21:
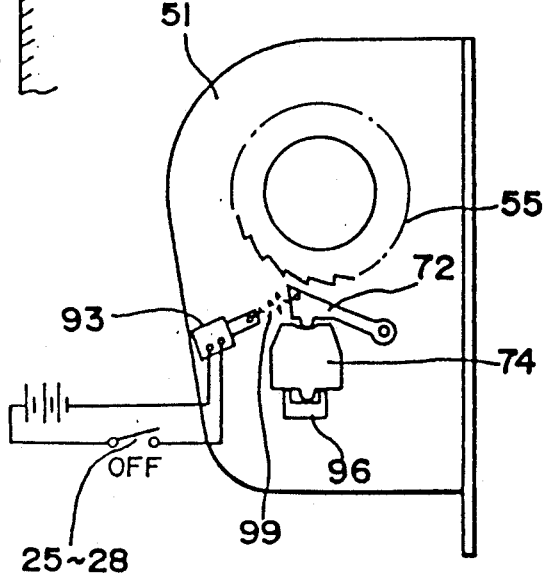
FIG. 21 is a schematic side view of the sensitivity reducing mechanism according to a third embodiment thereof.

Moreover, as shown in FIG. 21, the sensitivity reducing mechanism 90 may alternatively comprise a tension spring 99 connected at one end to the actuating member 72 and at the other end to the solenoid unit 93, said tension spring 99 acting to pull the actuating member 72 in a direction required to cause the projection 72a to be seated in the spherical recess 74a in the weight 74 while applying a predetermined pressure to the weight 74 through the actuating member 72. When the solenoid unit 93 is electrically energized in a manner as hereinbefore described, the tension spring 99 can expand and, therefore, the pressure applied to the weight 74 through the actuating member 72 can be increased to render the weight 74 somewhat difficult to be rocked, so as to be stably supported in the upright position.

Figure 22:
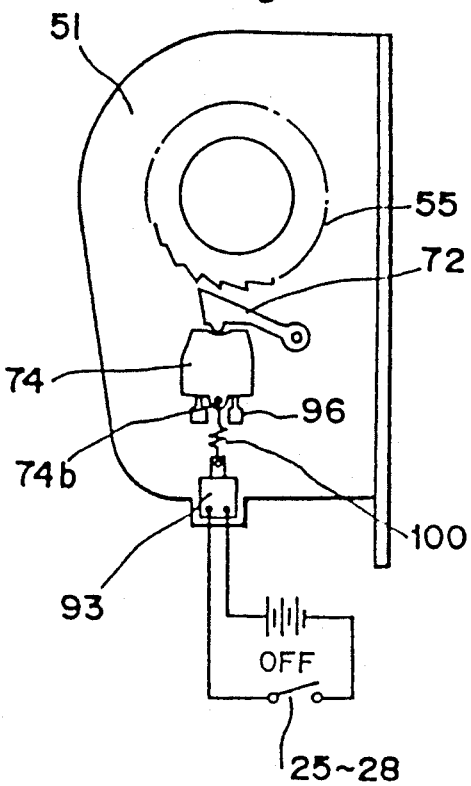
FIG. 22 is a schematic side view of the sensitivity reducing mechanism according to a fourth embodiment thereof.

It is clear that even the alternative sensitivity reducing mechanism 90 shown in FIG. 21 can bring about effects similar to those exhibited by the sensitivity reducing mechanism 90 shown in FIGS. 16 to 18. It is to be noted that, as shown in FIG. 22, a tension spring 100 functionally equivalent to the tension spring 99 shown in FIG. 21 may be connected between the weight 74 and the solenoid unit 93, said tension spring 100 acting to pull the weight 74 downwards to seat the weight 74 on the weight support 96. Even the arrangement shown in FIG. 22 can bring about effects similar to those exhibited by the sensitivity reducing mechanism 90 shown in FIGS. 16 to 18.

Referring now to FIG. 27, an electric control circuit employed in association with the seat belt apparatus according to the present invention includes the various switches 25 to 28 which are connected in parallel, the solenoid unit 82 (where the cancelling mechanism 80 is employed) or 93 (where the sensitivity reducing mechanism 90 is employed), all of said elements 25 to 28 and 82 or 93 being connected to a control unit 101 for controlling the solenoid unit 82 or 93.

The control unit 101 comprises a first pnp-type transistor Tr1 adapted to be switched on when any one of the switches 25 to 28 is closed, and a second npn-type transistor Tr2 adapted to be switched on upon conduction of the first transistor Tr1 to thereby connect the solenoid unit 82 or 93 with the associated electric power source.

Figure 28:
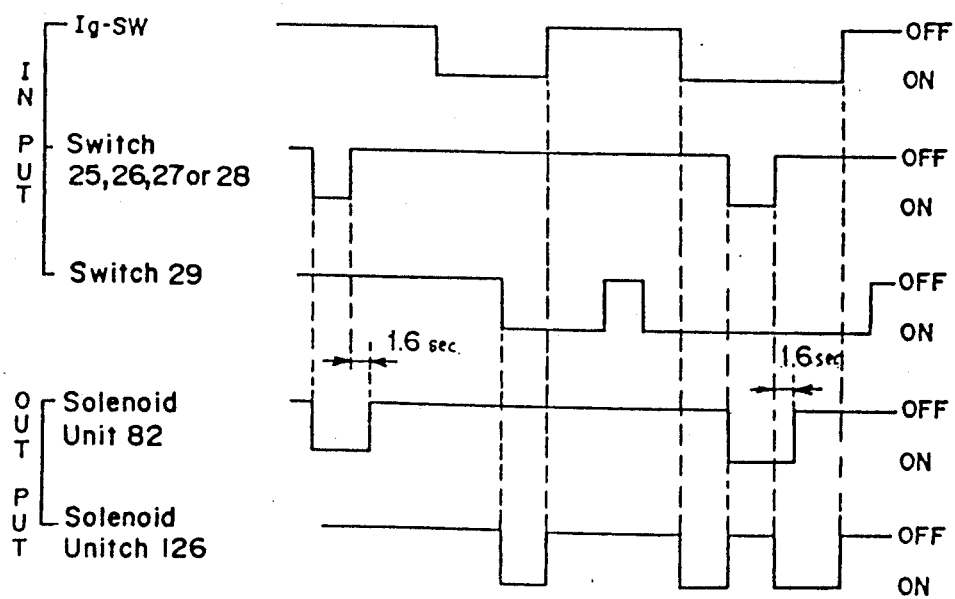
FIG. 28 is a timing chart showing the operation of the seat belt apparatus as controlled by the electric control circuit of FIG. 27.

The control unit 101 also includes a hold circuit which comprises a capacitor C which can be charged when any one of the switches 25 to 28 is closed, and a Zener diode ZD operable to maintain the voltage, discharged from the capacitor C, at a constant value for a predetermined length of time, for example, 1.6 seconds to thereby hold the first transistor Tr1 in the conductive state. This hold circuit is so designed that, for a predetermined length of time (see FIG. 28) subsequent to the closure of any one of the closure members including the front side door, the rear side door, the bonnet and the trunk lid, the solenoid unit 82 or 93 can be kept in the energized state to permit the sensitivity reducing mechanism 90 to be operated only for such predetermined length of time.

With the electric control circuit as hereinabove described, the closure of any one of the switches 25 to 28, for example, the switch 26 associated with the rear side door 11 results in an actuation of the cancelling mechanism 80 to halt the locking operation of the locking mechanism 70 disposed in the belt retractor 18.

More specifically, when the door switch 26 associated with the rear side door 26 is closed as a result of the movement of the rear side door 11 from the closed position to the opened position, the solenoid unit 82 of the cancelling mechanism 80 can be electrically energized (see FIG. 28) to cause the pivot lever 83 to shift in the arrow-headed direction to bring the rod 84 into contact with the actuating member 72, as shown by the phantom lines in FIG. 15(a). Once the rod 84 is brought into contact with the actuating member 72 in the manner as hereinbefore described, the actuating member will not pivot clockwise about the pivot pin 73 as viewed in FIG. 15(a) and will not therefore be engaged with the ratchet wheel 55 with the locking mechanism 70 consequently disabled.

In view of the foregoing, when the rear side door 11 is moved from the closed position to the opened position, the locking mechanism 70 will not be prematurely operated under the influence of the acceleration induced by the rear side door 11. Therefore, the rear side door 11 can be opened smoothly without the seat being constrained by the length of belt B.

A similar operation can take place when any one of the switches 25, 27 and 28 other than the switch 26 associated with the rear side door 11 is closed. In other words, when any one of the switches 25 to 28 is closed, the solenoid unit 82 of the cancelling mechanism 80 is electrically energized (See FIG. 28) to cause the pivot lever 83 to be shifted in the arrow-headed direction to bring the rod 84 into contact with the actuating member 72, as shown by the phantom line in FIG. 15(a). Once the rod 84 is brought into contact with the actuating member 72 in the manner as hereinbefore described, the actuating member will not pivot clockwise about the pivot pin 73 as viewed in FIG. 15(a) and will not therefore be engaged with the ratchet wheel 55 with the locking mechanism 70 consequently disabled.

Thus, according to the present invention, any possible erroneous operation of the locking mechanism 70 which would occur under the influence of vibrations induced in the automobile body structure when any one of the closure members is closed can be advantageously prevented, thereby contributing to the reliability of the belt retractor 18.

When the sensitivity reducing mechanism 90 is employed in place of the cancelling mechanism 80, the sensitivity of the locking mechanism 70 can be lowered by the sensitivity reducing mechanism 90 when at least one of the switches 25 to 28 is closed upon the opening of the associated closure member. In a case, the solenoid unit 93 should supersede the solenoid unit 82 in the circuit of FIG. 27. More specifically, when at least one of the switches 25 to 28 is closed upon the opening of the associated closure member, the solenoid unit 93 of the sensitivity reducing mechanism 90 can be electrically energized to drive the lock control member 92 and thereby cause the lock control member 91 to be shifted upwards as viewed in FIGS. 16 to 18, that is, to be pivoted counterclockwise about the pivot axis, so that the weight 74 can be supported substantially upright on the projections 91b on the lock control member 91. The projections 91b contact from below the annular end face of the weight 74 extend around the coaxial spindle 74b from below thereby lowering the sensitivity of the locking mechanism 70 as a whole. Thus, any possible erroneous or premature operation of the locking mechanism 70 which would occur under the influence of vibrations induced in the automobile body structure when at least one of the closure members is closed by the application of an ordinary force can be advantageously prevented, whereby the reliability of the belt retractor 18 is increased.

It is to be noted that, although the closure of the closure member such as, for example, the front side door 10, the rear side door 11, the hood 100 or the trunk lid, results in the opening of the associated switch 25, 26, 27 or 28, the cancelling mechanism 80 or the sensitivity reducing mechanism 90 can be held in the operated condition for a predetermined length of time by the action of the hold circuit including the capacitor C and the Zener diode ZD. In other words, immediately after the closure of the closure member, the capacitor C in the hold circuit starts its discharge and the Zener diode ZD operates to keep the first transistor Tr1 in the conducting state for a predetermined length of time to allow the solenoid unit 82 or 93 of the mechanism 80 or 90 to be kept electrically energized for the predetermined length of time (for example, 1.6 seconds). Hence, the cancelling mechanism 80 or the sensitivity reducing mechanism 90 can be operated for the predetermined length of time even though the closure member has been closed.

Thus, according to the present invention, any possible erroneous operation of the locking mechanism 70 which would occur under the influence of vibrations induced in the automobile body structure when any one of the closure members is abruptly closed can be advantageously prevented so as to contribute to the reliability of the belt retractor 18.

The belt retractor 18 referred to hereinbefore is provided with a tension relieving mechanism 110 operable to permit an outward pull of the length of belt B while restricting a winding of the same when the length of belt B is in use, that is, to restrain the seat occupant. This jecture will now be described with particular reference to FIGS. 23 and 24.

Figure 23:
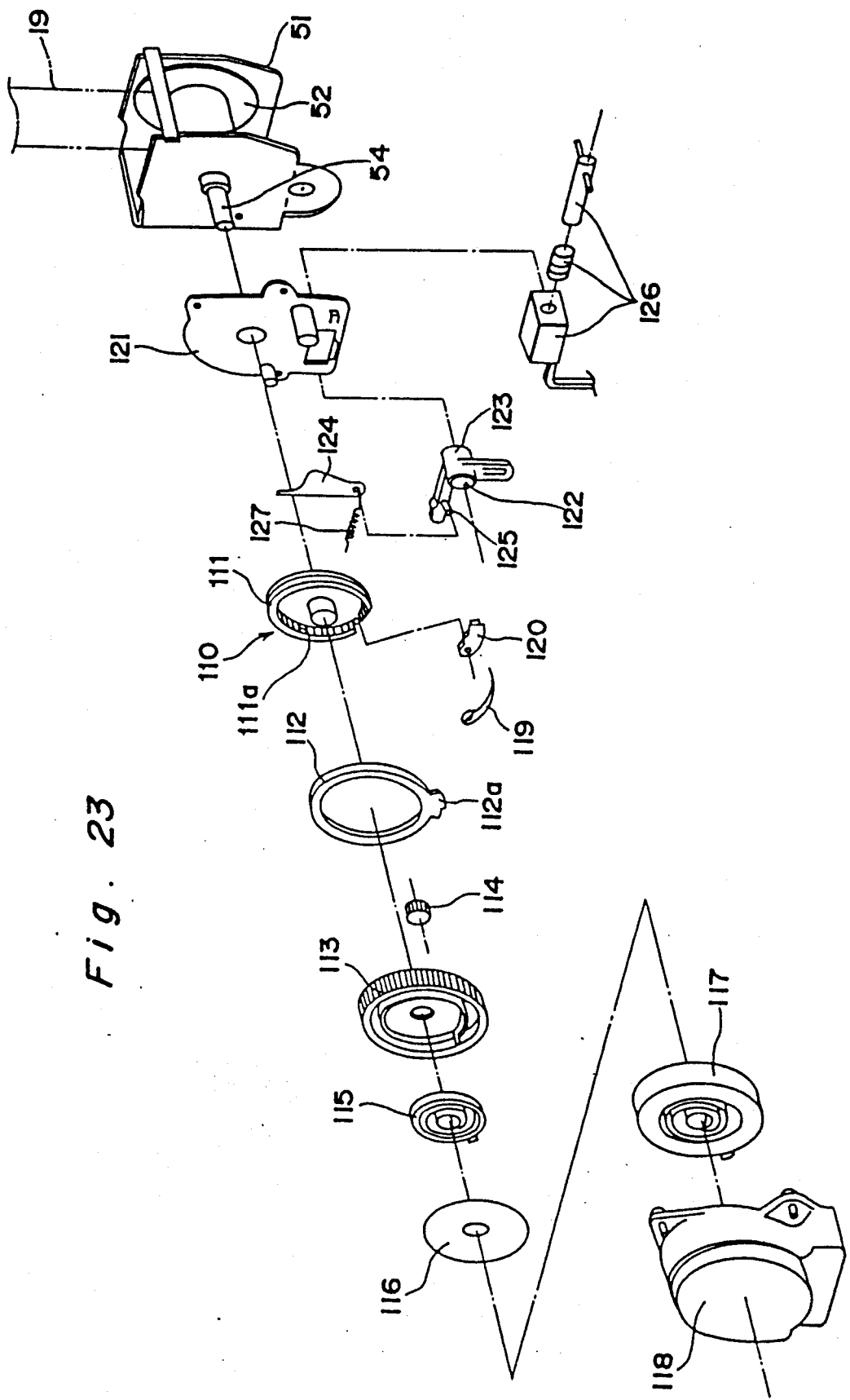
FIG. 23 is an exploded view of the belt retractor employing a tension reliever.

As best shown in FIG. 23, the tension relieving mechanism 110 comprises an internally toothed plate gear 111 having an internal gear 111a and rigidly secured to the winding shaft 54 (FIG. 14) for rotation therewith, a clutch plate 112 and an externally toothed gear holder 113 both coupled frictionally with the plate gear 111 in a coaxial relationship with each other, and an idle gear 114 fitted to the gear holder 113 for engaging the internal gear 111a of the plate gear 111. The gear holder 113 accommodates therein a spring memory element 115 and a cap spring 116 and is provided with a return biasing spring 117 for biasing the winding shaft 54 in a predetermined direction required to wind up the length of belt B. A cover plate 118 encloses these component parts.

The plate gear 111 has a hood member 120 fitted thereto and biased radially inwardly of the plate gear 111 by a hook-shaped spring 119.

The tension relieving mechanism 110 also comprises a lever 123 pivotally connected at a substantially intermediate portion thereof to a retainer 121, secured to the base unit 51, by means of a pivot pin 122 for allowing pivotal up and down movement of lever 123. The lever 13 has one end to which a friction plate 124 is pivotably connected by means of a connecting pin 125, and another end coupled with a solenoid unit 126. It is to be noted that the solenoid unit 126 referred to above is adapted to be controlled by a drive circuit shown in FIG. 27, the details of the operation thereof being described later. The friction plate 124 pivotably connected to the lever 123 as hereinabove described is normally biased clockwise about the connecting pin 125 by the action of a spring 127.

Figure 24C:
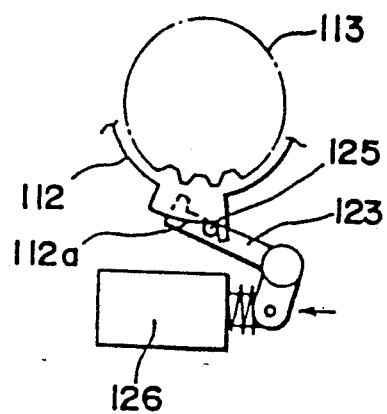
Figure 24D:
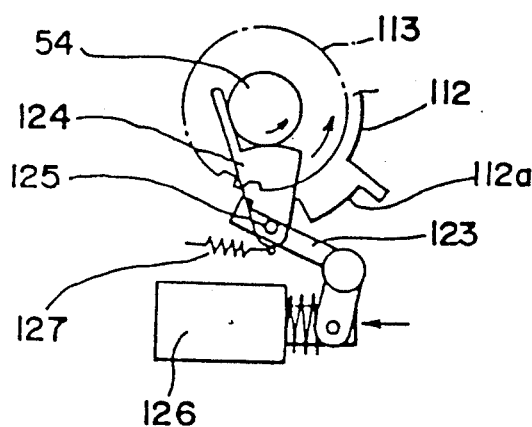
Figure 24A:
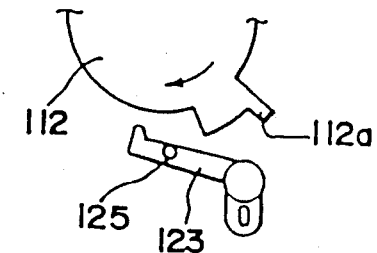
Figure 24B:
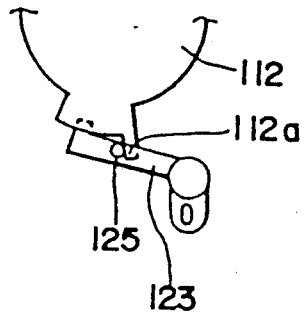

The tension relieving mechanism 110 having the above described structure is designed so that, although the clutch plate 112 frictionally coupled with the plate gear 111 can rotate clockwise when the winding shaft 54 is rotated clockwise as shown in FIG. 24(a) as a result of the outward pull of the length of belt B, a projection integral with the clutch plate 112 is engaged by the connecting pin 125, as shown in FIG. 24(b) and, therefore, rotation of the clutch plate 112 is limited.

The insertion of the latch plate 20 (FIGS. 3 and 4), through which the length of belt B extends, into the buckle 21 results in the closure of the buckle switch 29 and, therefore, the solenoid unit 126 is electrically energized. Upon the energization of the solenoid unit 126, the lever 123 tends to rotate clockwise; however, the lever 123 does not engage the gear holder 113 because the connecting pin 125 on the lever 123 is brought into engagement with the projection 112a integral with the clutch plate 112 as shown in FIG. 24(c).

Subsequent to the insertion of the latch plate 20 into the buckle 21, the winding shaft 54 is biased to rotate in the direction tending to wind up the length of belt B (i.e., counterclockwise as viewed in FIG. 24) by the action of a biasing force exerted by the return biasing spring 117 as shown in FIG. 24(d) Consequently, the clutch plate 112 is also rotated counterclockwise so that the projection 112a can be disengaged from the connecting pin 125 on the lever 123. Subsequent to the disengagement of the projection 112a from the connecting pin 125, the friction plate 124 pivotally mounted on the connecting pin 125 is brought into engagement with the winding shaft 54 to prevent the lever 123 from being engaged with the gear holder 113.

Figure 24E:
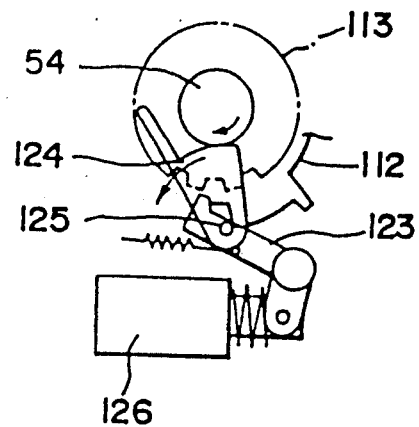

When the length of belt B having been positioned around the seat occupant is pulled a slight distance outwardly from the belt retractor 18, accompanied by a clockwise rotation of the winding shaft 54, the friction plate 124 is pivoted counterclockwise as shown in FIG. 24(e) to disengage from the winding shaft 54, permitting the lever 123 to engage with the gear holder 113 as shown in FIG. 24(f).

Starting from the condition shown in FIG. 24(f) and when the length of belt B is subsequently wound up a slight distance into the retractor 18, the lever 123 is brought into engagement with the gear holder 113 to lock the latter, thereby preventing the winding shaft from being rotated in a winding direction (counterclockwise) in which the length of belt B would be wound up as shown in FIG. 24(g).

The tension relieving operation occurs in such a manner that, when the hook 120 mounted on the plate gear 111 is brought into engagement with an inner projection 113a, formed in the gear holder 113 so as to project radially inwardly thereof, as shown in FIG. 24(h), the rotation of the winding shaft 54 in the winding direction is prevented. This is possible because of the unique construction of the idle gear 114 which will now be described with particular reference to FIG. 25.

As best shown in FIG. 25, the idle gear 114 has a plurality of gear teeth, one 114a of which extends over the entire length of the idle gear in a direction axially thereof. Therefore, when the tooth 114a of the idle gear 114 is brought into engagement with the projection 120a integral with the hook 120 to cause the hook to pivot in a direction away from the idle gear 114 as shown by the arrow in FIG. 26, the hook 120 is brought into engagement with the inner projection 113a of the gear holder 113 as shown in FIG. 24(h). Thus, the outward pull of the length of belt B relative to the retractor 18 can be permitted and no winding thereof takes place, thereby establishing a tension relieved condition.

When the length of belt B is pulled outwards relative to the retractor 18 while in the tension relieved condition as shown in FIG. 24(h), the plate gear 111 is rotated clockwise as shown in FIG. 24(i), allowing the hook 119 to be disengaged from the inner projection 113a of the gear holder 113. When the length of belt B is subsequently wound up, the hook 119 is brought again into engagement with the inner projection 113a of the gear holder 113 to again assume the tension relieved condition shown in FIG. 24(h). In other words, the amount (winding amount) of the length of belt B pulled outwards relative to the retractor 18 is memorized so that the length of belt B can be reset to the same pulling amount (winding amount). The amount memorized can be determined depending on the number of teeth of one or both of the plate gear 111 and the idle gear 114. It is, however, to be noted that, during the normal use, the plate gear 111 and the gear holder 113 are maintained in a predetermined positional relationship as shown in FIG. 24(i) by the action of the spring memory element 115.

Should the latch plate 21 be released from the buckle 20, the buckle switch 29 is turned off to deenergize the solenoid unit 126 (See FIG. 28) and, therefore, the lever 123 is pivoted counterclockwise to disengage from the gear holder 113. Once the lever 123 is so disengaged from the gear holder 113, the tension relieved condition as shown in FIG. 24(h) is released.

While the seat belt apparatus according to the present invention as hereinbefore described, operates such that in the event that, for example, that the rear side door 11 is opened while the person occupying the seat assembly 14 is restrained by the length of belt B, the length of belt B can be pulled outwards relative to the belt retractor 18 because the tension relieving mechanism 110 is then in operation. Therefore, an inconvenient situation may occur in that, when the rear side door 11 once opened is subsequently closed, the tension relieving mechanism 110 may be brought into operation to prevent the length of belt B from being retracted into the belt retractor 18 and may be slackened. However, the switch 26 associated with the rear side door 11 is closed, when the rear side door 11 is opened, to provide the electric signal indicative of the closure of the rear side door 11 by which signal the solenoid unit 126 can be deenergized (see FIG. 28) to disengage the lever 123 from the gear holder 113 to release the tension relieved condition. Therefore, even when the rear side door 11 is closed, the length of belt B can be wound up into the belt retractor 18 and will not be slackened.

The operation of the solenoid unit 126 of the tension relieving mechanism 110 will further be described with particular reference to FIG. 27. Assuming that the buckle switch 29 is closed, the fourth transistor Tr4 is switched on by the third transistor Tr3 which has been switched on upon the closure of an automobile ignition switch IG, resulting in the energization of the solenoid unit 126. Hence, under this condition, the tension relieving mechanism 110 is brought into a normal ON state.

On the other hand, when the rear side door 11 in which the belt retractor 18 is installed is opened, the rear door switch 26 is closed and the third transistor Tr3 is consequently switched off, followed by the fourth transistor Tr4 being switched off. Therefore, the solenoid unit 126 can be deenergized even though the buckle switch 29 is kept switched on, releasing the tension relieved condition.

Although the present invention has been fully described in connection with preferred embodiments thereof with reference to the accompanying drawings, it is to be noted that various changes and modifications will become apparent to those skilled in the art. By way of example, although in the foregoing description the belt retractor 18 has been shown and described as installed in the rear side door 11, the present invention is not limited thereto and the belt retractor 18 may be installed in the front side door 10. In addition, the seat belt apparatus according to the present invention may be employed for each seat assembly in the automobile body structure and, therefore, the seat assembly 14 is not be limited to the driver's seat.

Accordingly, such changes and modifications are to be understood as included within the scope of the present invention as defined by the appended claims, unless they otherwise depart therefrom.

I claim:

1. In an automotive vehicle having a vehicle body structure defining a plurality of utility openings therein respectively leading into a passenger compartment, an engine compartment, and a trunk compartment, a seat assembly disposed within the vehicle body structure, and a plurality of closure members hingedly connected to the body structure over the utility openings, respectively, so as to be movable between open and closed positions at which the utility openings are respectively opened and closed by the closure members, the closure members including front, side doors hingedly connected over respective ones of the utility openings leading into the passenger compartment, rear, side doors hingedly connected over respective ones of the utility openings leading into the passenger compartment, a hood hingedly connected over one of the utility openings leading into the engine compartment, and a trunk lid hingedly connected over the utility opening leading into the trunk compartment, a seat belt apparatus for restraining an occupant of the seat assembly, said seat belt apparatus comprising:

a length of flexible belt having first and second opposite ends;

a belt anchor fixing the first end of said flexible belt relative to the vehicle body structure;

a seat belt retractor disposed within one of the rear, side doors, said seat belt retractor including automatic winding means connected to the second end of said flexible belt for exerting a tension force on said belt that tends to automatically forcibly wind the belt into the seat belt retractor, locking mechanism means for preventing said belt from being able to be pulled out from the seat belt retractor when a predetermined acceleration acts on the seat belt retractor, and a cancelling mechanism operative to disable said locking mechanism means from preventing said belt from being pulled out from the seat belt retractor when said predetermined acceleration acts thereon; and control means including belt detecting means for detecting whether at least one of the closure members other than said one of the rear, side doors is in the open position thereof, said control means operatively connected to said cancelling mechanism for operating said cancelling mechanism to disable said locking mechanism means when said detecting means has detected that said at least one of the closure members is in the open position thereof.

2. The seat belt apparatus in an automotive vehicle as claimed in claim 1, wherein said control means further includes hold means for maintaining the operation of said cancelling mechanism for a predetermined amount of time subsequent to the arrival of said at least one of the closure members to the closed position thereof from the open position thereof.

3. The seat belt apparatus in an automotive vehicle as claimed in claim 1, wherein said at least one of the closure members includes the hood.

4. The seat belt apparatus in an automotive vehicle as claimed in claim 1, wherein said at least one of the closure members includes the trunk lid.

5. In an automotive vehicle having a vehicle body structure defining a plurality of utility openings and a passenger compartment therein, a seat assembly disposed within the vehicle body structure, front, side doors hingedly connected over respective ones of the utility openings leading into the passenger compartment, rear, side doors hingedly connected over respective ones of the utility openings leading into the passenger compartment, so as to be movable between open and closed positions at which such utility openings are respectively opened and closed by the doors, and a plurality of closure members hingedly connected to the body structure over the utility openings, respectively, so as to be movable between open and closed positions at which such utility openings are respectively opened and closed by the closure members, a seat belt apparatus for restraining an occupant of the seat assembly, said seat belt apparatus comprising:

a length of flexible belt having first and second opposite ends;

a belt anchor fixing the first end of said flexible belt relative to the vehicle body structure;

a seat belt retractor disposed within one of the side doors, said seat belt retractor including automatic winding means connected to the second end of said flexible belt for exerting a tension force on said belt that tends to automatically forcibly wind the belt into the seat belt retractor, locking mechanism means for preventing said belt from being able to be pulled out from the seat belt retractor when a predetermined acceleration acts on the seat belt retractor, and a sensitivity reducing mechanism operative to increase that magnitude of acceleration on the seat belt retractor at which the locking mechanism means will prevent the belt from being able to be pulled out from the retractor thereby lowering the sensitivity of the locking mechanism means; and control means including first detecting means for detecting whether said one of the side doors is in the open position thereof, and second detecting means for detecting whether at least one of the closure members is in the open position thereof, said control means operatively connected to said sensitivity reducing mechanism for operating the sensitivity reducing mechanism to lower the sensitivity of said locking mechanism when both said first and said second detecting means detect that said one of the side doors and said at least one of the closure members are in the open positions thereof, respectively.

6. The vehicle body structure as claimed in claim 5, wherein said control means further includes hold means for maintaining the operation of said sensitivity reducing mechanism for a predetermined amount of time subsequent to the arrival of said one of the side doors and said at least one of the closure members to the closed positions thereof.

7. The vehicle body structure as claimed in claim 5, wherein said at least one of the closure members includes the hood of the vehicle.

8. The vehicle body structure as claimed in claim 5, wherein said at least one of the closure members includes the trunk lid of the vehicle.

9. In an automotive vehicle having a vehicle body structure defining a plurality of utility openings and a passenger compartment therein, a seat assembly disposed within the vehicle body structure, front, side doors hingedly connected over respective ones of the utility openings leading into the passenger compartment, rear, side doors hingedly connected over respective ones of the utility openings leading into the passenger compartment, so as to be movable between open and closed positions at which such utility openings are respectively opened and closed by the doors, and a plurality of closure members hingedly connected to the body structure over the utility openings, respectively, so as to be movable between open and closed positions at which such utility openings are respectively opened and closed by the closure members, a seat belt apparatus for restraining an occupant of the seat assembly, said seat belt apparatus comprising:

a length of flexible belt having first and second opposite ends;

a belt anchor fixing the first end of said flexible belt relative to the vehicle body structure;

a seat belt retractor disposed within one of the side doors, said seat belt retractor including automatic winding means connected to the second end of said flexible belt for exerting a tension force on said belt that tends to automatically forcibly wind the belt into the seat belt retractor, locking mechanism means for preventing said belt from being able to be pulled out from the seat belt retractor when a predetermined acceleration acts on the seat belt retractor, and a sensitivity reducing mechanism operative to increase that magnitude of acceleration on the seat belt retractor at which the locking mechanism means will prevent the belt from being able to be pulled out from the retractor thereby lowering the sensitivity of the locking mechanism means; and control means including detecting means for detecting whether at least one of the closure members is in the open position thereof, said control means operatively connected to said sensitivity reducing mechanism for operating the sensitivity reducing mechanism to lower the sensitivity of said locking mechanism when said detecting means detects that said at least one of the closure members is in the open position thereof.

10. The seat belt apparatus in an automotive vehicle as claimed in claim 9, wherein said control means includes hold means for maintaining the operation of said sensitivity reducing mechanism for a predetermined amount of time subsequent to the arrival of said at least one of the closure members to the closed position thereof from the open position thereof.

11. The vehicle body structure as claimed in claim 9, wherein said at least one of the closure members includes the hood of the vehicle.

12. The vehicle body structure as claimed in claim 9, wherein said at least one of the closure members includes the trunk lid of the vehicle.

* * * * *